(12) United States Patent
Call

(10) Patent No.: US 7,178,100 B2
(45) Date of Patent: Feb. 13, 2007

(54) METHODS AND APPARATUS FOR STORING AND MANIPULATING VARIABLE LENGTH AND FIXED LENGTH DATA ELEMENTS AS A SEQUENCE OF FIXED LENGTH INTEGERS

(76) Inventor: Charles G. Call, 68 Horse Pond Rd., West Yarmouth, MA (US) 02673

( * ) Notice: Subject to any disclaimer, the term of this patent is extended or adjusted under 35 U.S.C. 154(b) by 952 days.

(21) Appl. No.: 10/012,815

(22) Filed: Dec. 10, 2001

(65) Prior Publication Data

US 2002/0143521 A1    Oct. 3, 2002

Related U.S. Application Data

(60) Provisional application No. 60/255,807, filed on Dec. 15, 2000.

(51) Int. Cl.
*G06F 15/00*    (2006.01)
*G06F 17/00*    (2006.01)
(52) U.S. Cl. ............... 715/513; 715/523; 715/531; 707/101; 709/247
(58) Field of Classification Search .............. None
See application file for complete search history.

(56) References Cited

U.S. PATENT DOCUMENTS

| | | | | |
|---|---|---|---|---|
| 5,179,378 | A | * | 1/1993 | Ranganathan et al. ........ 341/51 |
| 5,534,861 | A | * | 7/1996 | Chang et al. ................. 341/79 |
| 5,799,308 | A | * | 8/1998 | Dixon ........................ 707/100 |
| 5,991,713 | A | * | 11/1999 | Unger et al. ................... 704/9 |
| 6,233,580 | B1 | * | 5/2001 | Kaplan et al. .............. 707/101 |
| 6,345,307 | B1 | * | 2/2002 | Booth ........................ 709/247 |

(Continued)

OTHER PUBLICATIONS

Ziv, J. Lempel, A. "A universal algorithm for sequential data compression" IEEE transactions on Information Theory May 1977, vol. 23, pp. 337-343.*

(Continued)

*Primary Examiner*—David Hudspeth
*Assistant Examiner*—Matthew J. Sked
(74) *Attorney, Agent, or Firm*—Charles G. Call

(57) ABSTRACT

Apparatus for storing and processing a plurality of data items each comprising supplied data values organized in one or more fields each of which stores typed data. Character strings and natural language text are converted to numerical token values in an array of fixed length integers and other forms of typed data (real numbers, dates, times, boolean values, etc.) are also converted to integer form and stored in the array. Stored metadata specifies the data type of all data in the integer array to enable each integer to be rapidly accessed and interpreted. When fixed length data types are present, the metadata specifies location, size and type of each fixed length element. When variable length data is stored in the integer array, size and location data stored in the integer array is accessed to rapidly and directly access the variable size data. The presence of implicit or explicit size information for each data structure, including variable size structures, speeds processing by eliminating the need to scan the data for delimiters, and by reducing the processing needed to perform memory allocation, data movement, lookup operations and data addressing functions. Data stored in the integer array is subdivided into items, and items are subdivided into fields. Items may be organized into more complex data structures, such as relational tables, hierarchical object structures, linked lists and trees, and the like, using special fields called links which identify other referenced items.

13 Claims, 7 Drawing Sheets

U.S. PATENT DOCUMENTS

| | | | |
|---|---|---|---|
| 6,456,209 B1 * | 9/2002 | Savari ........................ | 341/67 |
| 6,883,137 B1 * | 4/2005 | Girardot et al. ............ | 715/513 |
| 2002/0029229 A1 * | 3/2002 | Jakopac et al. ............. | 707/500 |
| 2004/0064588 A1 * | 4/2004 | Jungck ....................... | 709/247 |

OTHER PUBLICATIONS

Savari, S. "Variable-to-fixed length codes for predictable sources" Data Compression Conference Apr. 1998, pp. 481-490.*

Visweswariah, Karthik. "Universal Variable-to-fixed length source codes" IEEE transactions on Information Theory, May 2001, vol. 47, pp. 1461-1472.*

Ainon, Raja N. "Storing text using integer codes", International Conference on Computational Linguistics, pp. 418-420 Germany 1986.*

Liefke, H. Suciu, D. "XMill: an efficient compressor for XML data", Internation Conference on Management Data 2000, pp. 153-164.*

* cited by examiner

METHODS AND APPARATUS FOR STORING AND MANIPULATING VARIABLE LENGTH AND FIXED LENGTH DATA ELEMENTS AS A SEQUENCE OF FIXED LENGTH INTEGERS

CROSS-REFERENCE TO RELATED PATENT APPLICATIONS

This application claims the benefit of the filing date of U.S. provisional patent application Ser. No. 60/255,807 filed on Dec. 15, 2000, and further claims the benefit of the filing date of U.S. patent application Ser. No. 09/793,267 filed on Feb. 26, 2001 entitled "Methods and apparatus for storing and manipulating natural language text data as a sequence of fixed length integers," the disclosure of which is hereby incorporated by reference.

REFERENCE TO COMPUTER PROGRAM LISTING APPENDIX

A computer program listing appendix is stored on each of two duplicate compact disks which accompany this specification. Each disk contains computer program listings as in the Pascal programming language which provide detailed illustrative implementations of portions of the invention and are hereby incorporated into this specification by reference. These listings re recorded as ASCII text in IBM PC/MS DOS compatible files which have the names, sizes (in bytes) and creation dates listed below:

| File Name | Bytes | Created | |
|---|---|---|---|
| a1_date.pas | 13,941 | Mar. 10, 1997 | 9:34a |
| aboutform.pas | 649 | Jan. 14, 1997 | 9:40p |
| AutoForm.pas | 2,493 | Feb. 15, 1997 | 6:05p |
| Builder.pas | 16,805 | Dec. 2, 2000 | 6:34p |
| combiners.pas | 2,565 | Nov. 23, 2000 | 8:46p |
| DisplayFields.pas | 1,471 | Mar. 10, 1997 | 6:12p |
| DOMunit2.pas | 9,898 | Dec. 3, 2000 | 3:43p |
| Exporter.pas | 7,953 | Dec. 2, 2000 | 6:34p |
| Extract.pas | 3,060 | Mar. 10, 1997 | 5:56p |
| FieldForm.pas | 301 | Dec. 13, 1996 | 10:29p |
| Fields.pas | 567 | Mar. 9, 1997 | 11:53a |
| filter.pas | 921 | Jan. 8, 1997 | 8:23p |
| flagconstants.pas | 7,118 | Nov. 23, 2000 | 8:46p |
| FldForm.pas | 299 | Dec. 13, 1996 | 10:24p |
| FormDoc.pas | 5,115 | Feb. 10, 1997 | 10:51p |
| ilaunch.pas | 4,206 | Feb. 22, 1997 | 9:40p |
| impform.pas | 779 | Feb. 10, 1997 | 10:52p |
| Importer.pas | 10,384 | Mar. 10, 1997 | 5:55p |
| is_proj.dpr | 1,085 | Mar. 9, 1997 | 9:43a |
| Items.pas | 90,471 | Mar. 15, 1997 | 10:59a |
| itemsort.pas | 5,542 | Dec. 14, 1996 | 10:49a |
| iXMLproject.dpr | 398 | Dec. 2, 2000 | 8:41p |
| layout.pas | 1,806 | Feb. 15, 1997 | 6:54p |
| layout3.pas | 4,116 | Feb. 27, 1997 | 9:50a |
| LibWork.pas | 6,024 | Dec. 2, 2000 | 6:35p |
| Main.pas | 13,649 | Dec. 2, 2000 | 6:34p |
| nacnum.pas | 16,491 | Jan. 5, 1997 | 11:11a |
| NACTEST.dpr | 218 | Dec. 12, 1996 | 10:04p |
| NACUNIT.pas | 891 | Dec. 12, 1996 | 10:57p |
| NodeWork.pas | 1,184 | Dec. 2, 2000 | 10:06p |
| numera.pas | 9,640 | Mar. 10, 1997 | 2:40p |
| numprog.dpr | 218 | Jan. 5, 1997 | 7:53p |
| numtest.pas | 1,020 | Jan. 5, 1997 | 8:03p |
| NumWork.pas | 2,390 | Dec. 2, 2000 | 9:58p |
| oldsets.pas | 16,655 | Feb. 9, 1997 | 4:08p |
| parsproj.dpr | 194 | Dec. 23, 1996 | 11:09p |
| parsunit.pas | 3,076 | Dec. 23, 1996 | 11:08p |
| rules01_20.pas | 20,333 | Nov. 26, 2000 | 9:25p |
| rules21_38.pas | 13,031 | Nov. 25, 2000 | 11:05a |
| rules39_40.pas | 7,631 | Nov. 26, 2000 | 9:34p |
| rules41_60.pas | 17,804 | Nov. 24, 2000 | 2:59a |
| Rules61_80.pas | 12,854 | Nov. 23, 2000 | 8:46p |
| Rules81plus.pas | 13,371 | Nov. 23, 2000 | 8:46p |
| savedlg.pas | 2,046 | Feb. 10, 1997 | 10:52p |
| SetBuilder.pas | 4,583 | Jan. 30, 1997 | 8:02p |
| SetForm.pas | 954 | Dec. 13, 1996 | 10:47p |
| setgrid.pas | 2,458 | Feb. 10, 1997 | 10:51p |
| Sets.pas | 20,567 | Feb. 13, 1997 | 10:37a |
| settest.dpr | 274 | Dec. 13, 1996 | 10:49p |
| ShowLoad.pas | 1,115 | Feb. 10, 1997 | 10:49p |
| ShowMemStat.pas | 1,477 | Feb. 10, 1997 | 10:53p |
| Sort.pas | 12,203 | Feb. 8, 1997 | 3:51p |
| termclass.pas | 114 | Dec. 1, 1996 | 10:31a |
| terms.pas | 27,017 | May 19, 1997 | 7:07p |
| termstore.pas | 122 | Dec. 1, 1996 | 10:40a |
| TestBed.pas | 2,572 | Dec. 2, 2000 | 6:34p |
| text.pas | 6,770 | May 19, 1997 | 8:23p |
| textwork.pas | 19,149 | Dec. 2, 2000 | 6:34p |
| xglobals.pas | 15,436 | Mar. 15, 1997 | 10:36a |

COPYRIGHT STATEMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to electronic data processing systems and more particularly, although in its broader aspects not exclusively, to methods and apparatus for storing and transmitting both variable length data (including text) and fixed length data and for performing processing operations on such data.

BACKGROUND OF THE INVENTION

Natural language text processed by computers is most commonly represented as a sequence of binary values each of which represents a character or symbol used in the visual representation of the language.

The widely used ASCII coding represents each of the commonly used letters, numbers and punctuation characters in English language text using 7-bit binary values which represent printable characters and control codes ("control characters") such as linefeed (LF) and escape (ESC) characters. To provide adequate capacity for the much larger number of characters and symbols used by other languages, the Universal Character Set (UCS or ISO 10646) and Unicode character set (a standard promulgated by the Unicode Consortium), both of which define tens of thousands of characters, have been defined. These more robust codes typically encode characters and symbols into 16 bit codes and, as a consequence, require even more storage space per character.

Such character based coding schemes for representing natural language text data are notoriously inefficient. Thus, when large files of character text are to be stored or transmitted, text compression programs are frequently used to make better use of storage space or reduce the bandwidth needed for trans-mission. Using compression algorithms such as Huffman coding and Ziv-Lempel coding, it is possible to reduce the size of text character files to a small fraction of their original size. The compressed text must, of course, be decompressed before it can be processed or displayed for human consumption.

It is accordingly desirable to employ a mechanism for compressing text character data into a more compact form that need not be decompressed before it can be processed.

For efficient processing, non-character data, such as boolean values, integers, floating point numbers, logical values, and the like, are typically represented by typed data structures which can be efficiently manipulated by computing machines. Difficulties are encountered, however, when such typed data must be used outside the environment of the particular computer program that formats the data in the first instance. While a given program running on a given computer can efficiently store a rich mixture of typed data in one or more files, and can retrieve and process those files with great efficiency, it is often extraordinarily difficult for a different program running on the same computing machine to interpret and successfully process such a file of typed data. Moreover, it extremely difficult even for skilled humans to interpret the binary data in such a typed file without knowing the structure and data types used by the source program. The problem is made considerably more difficult when an attempt is made to process typed data created by one processor using a different processor having a different machine architecture, or to share data between like processors operating under the control of different operating systems.

Complex data are frequently stored and manipulated using a relational database management system. In such a system, information is organized into relational tables, each of which comprises a two-dimensional set of named columns and an arbitrary number of rows. All of the entries in each column are of the same data type and drawn from the same domain. For addressing efficiency, a fixed amount of space is typically reserved for the data stored in a given column, permitting the location of each colunm within a row to be predicted. When variable length data is to be placed in a given column (e.g. the characters in a city name), enough space is reserved to provide room for even the largest city names, with the result tat most of the reserved space is unused. It would accordingly be desirable to provide a storage and addressing mechanism whereby variable length data elements may be efficiently stored without wasted space yet rapidly located and processed by an addressing mechanism that does not require scanning to identify imbedded delimiters or the like.

While relational database systems are well suited for storing structured business data, many types of data, such as the information in hierarchical tree structures as well as the nested elements typically found in XML data, do not map well into relational tables. Object oriented databases which support inheritance have notable advantages over relational databases for storing hierarchical data. It would accordingly be desirable to employ a database architecture which can efficiently store and process information organized and stored in relational, hierarchical and object-oriented databases, and particularly to employ a database architecture which efficiently handles variable length character data.

Notwithstanding the inherent storage and addressing inefficiencies normally associated with variable length character-based data representations, character data is increasingly chosen for communications on the Internet between heterogeneous machines and different operating systems. For example, the File Transfer Protocol (FTP), the Telnet protocol, the Simple Mail Transfer Protocol (SMTP) and the Hypertext Transport Protocol (HTTP) used on the Internet all communicate using character data. Data representations, such as the Hypertext Markup Language (HTML) and the Extensible Markup Language (XML) are both variable-length, character based representations that have been widely adopted for sharing data among different computers via the Internet.

These character based markup languages have admirably served their designer's goals, as demonstrated by their widespread adoption. These goals did not, however, include at attempt to make the data representation compact. Indeed, as expressed in the XML specification, "terseness in XML markup is of minimal importance." When markup tags and other character text are added to the original text data in order to express that data's structure and meaning, substantially more storage space is consumed.

Character based markup data is typically processed by parsing the data, character by character, to separate the data from the markup and to thereafter process the character data in accordance with the meaning given to it by the markup. In many applications, before XML character data is processed, its is parsed into a sequence of nodes each of which is represented in memory by a tree hierarchy of allocated node objects. The widely used Document Object Model (DOM) interface provides a universal and widely used structure for representing and operating on XML objects in the computer's memory. Unfortunately, the parsing of character data and the allocation of memory for the nodes of a DOM's object tree structure consumes substantial processing and memory resources, further exacerbating the coding inefficiency of the character based data and markup representation.

SUMMARY OF THE INVENTION

It is a one object of the present invention to represent character data, particularly natural language text and markup, in a more efficient compressed format which requires less storage space and needs less transmission bandwidth, and which can be more rapidly processed than character data.

It is a further object of the invention to store both fixed and variable length data as an addressable array of integer values organized to permit more efficient execution of processing functions of the type typically performed by database management systems.

It is a further object of the invention to store fixed and variable length data as an addressable array of integer values organized to provide efficient data manipulation functions typically performed by hierarchical object oriented data handling systems, including systems conforming to the Document Object Model widely used for storing and manipulating XML and HTML character data.

In accordance with a feature of the invention, character data which represents natural language text is converted to a more efficient compressed form by first parsing the text data into logical subdivisions (e.g., markup metadata and the words and intervening punctuation in natural language text) which encapsulate the meaning of the original characters, and replacing each of these subdivisions with a fixed length numerical integer value to form a sequence of fixed length integers representing the character data.

Because the data size of each integer (e.g. 16 bits or two characters) is much smaller than the corresponding text it represents (e.g. a typical English language word averaging about seven characters in length plus a following space), the sequence of integers occupies only a fraction of the space of the original character file. Moreover, as the total size of character based data in the database grows large, the relative size of the vocabulary of different terms and punctuation strings stored in the associated string table(s) becomes small. As a consequence, the combined size of the integer sequence and the string tables is typically less than half the size of the original text data represented.

Because the integers have a fixed length and each integer has independent meaning, the sequence of integers can be much more rapidly processed than the original file of characters. For example, to search a document of one thousand words for the word "Boston", a character search would normally be performed through eight thousand characters; whereas the same search through an array of a thousand integers can be performed by using an fast index search for the single unique integer value that represents "Boston."

The integer data can be efficiently saved in a mass storage device, such as a magnetic hard disk, and can be read, as a block, directly into RAM for processing without decompression. Because specific data may be rapidly and directly located in the random access integer array in memory, the use of index structures is typically unnecessary, significantly reducing the size of the database as well as reducing the processing burden otherwise imposed by the need to create and maintain index structures.

In addition to storing character strings and natural language text as numerical token values in an array of fixed length integers, other forms of typed data (real numbers, dates, times, boolean values, etc.) can be stored in the integer array. Stored metadata specifies the data type of all data in the integer array to enable each integer to be rapidly accessed and interpreted. When fixed length data types are present, the metadata specifies location, size and type of each fixed length element. When variable length data is stored in the integer array, size and location data stored in the integer array is accessed to rapidly and directly access the variable size data. The presence of implicit or explicit size information for each data structure, including variable size structures, speeds processing by eliminating the need to scan the data for delimiters, and by reducing the processing needed to perform memory allocation, data movement, lookup operations and data addressing functions.

In a preferred embodiment of the invention, data stored in the integer array is subdivided into items, and items are subdivided into fields. Items may be organized into more complex data structures, such as relational tables, hierarchical object structures, linked lists and trees, and the like, using special fields called links. Some of the important characteristics of items, fields and links are summarized in the outline below:

1. Items
   a. All value data in the database is organized into a collection of typed items each of which is represented by sequence of fixed length integers.
   b. Each item is independently addressable by its itemnumber. Itemnumbers are assigned to items when they are added to the database and do not change when the item is modified. Each itemnumber uniquely identifies one and only one item.
   c. All items are hence unordered siblings of one another. Neither the physical storage location of an item relative to the location of other items, nor the itemnumber assigned to the item, has any logical significance (other than implying the relative times at which the items were added to the database).
   d. Items may be related to one another in other ways. For example:
      i. Items may be grouped into ordered "sets" using the database's set manipulation functions. A set takes the form of a sequence of itemnumbers.
      ii. Relationships may be established between items by placing one or more links (itemnumbers) in an item to refer to one or more associated items.
   e. Each item's physical storage location is placed in a lookup table indexed by itemnumber, allowing any item to be indirectly addressed by is itemnumber, and allowing itemnumber links to be rapidly dereferenced to obtain the location of linked items.
   f. Each item contains an itemtype designation (an itemtypenumber) which specifies an item type metadata structure stored separately from the item itself and shared by all items of that itemtype.
      i. The metadata describing each itemtype consists of:
         (1) An optional name (which may be a qualified name in a namespace). The item name may be supplied by the user, or derived automatically from an XML schema or XML document. Two items whose type is identical in all other respects but which have different names are treated as different item types and are assigned different itemtypenumbers. Item names need not be unique if associated with differing type information.
         (2) A field list specifying an ordered list of the fieldnumbers of the fields which are included in the item.
         (3) A field map which translates the fieldnumber of a field in the item into the offset location of the data for that field within the item. The combination of the itemnumber lookup table and the field map permits any atomic unit of data in the database to be directly accessed in RAM storage by its itemnumber and fieldnumber.
         (4) Item Size. The size of the item may be determined from the itemtypenumber if the item has a predetermined fixed length, otherwise the location in the data array where the item size can be fetched is specified by the metadata indexed by the itemtypenumber.
   g. Thus, each item is composed of a predetermined set of one or more numbered fields (some of which may be empty), with the data in each field being located at (or via) predetermined integer positions within the item as specified by the itemtype's field map. Thus, while the position of items with respect to other items has no logical significance, the position of every field within an item is specified by the field map in the item type.

2. Fields
   a. Each field:
      i. contains a subsequence of zero or more integers.
      ii. may have a fixed or a variable length. Fixed length fields occupy a predetermined offset position within the item. Variable length fields are located within the item at a position specified by a pointer (offset value) located at the position within the item specified by field map.
      iii. is numbered when it is added to the database. The field number may thereafter be used to access the following information (metadata):

(1) Field name (if any), which may be a qualified name in a namespace. The field name may be supplied by the user, or by an XML schema or XML data when a named element or attribute is stored as a field.

Note, all XML attributes are simple types and are stored as fields in a typed item.

(2) Datatype number which operates as an index to a datatype information structure. The same datatype may be associated with different fields having different names.

iv. is typed by the metadata that is placed in a fieldtype structure indexed by fieldnumber. All fields of the same type in different items are designated by the same fieldnumber. Only one field designated by a given fieldnumber can be present in a single item.

v. is a simple type, or a collection of the same simple type; that is, each field consists of zero or more data values of the same type and the metadata which describes those data values. A single field may be defined to contain a plurality of like data value where the number of such like values is either fixed by the field type or defined as being a variable length field with the number of data values indicated by a count value in the data. Thus, an field named "Address" might contain a fixed number of 5 strings (some of which may be empty), or a field named "itemset" might contain an arbitrary number of itemnumber integers and a count value indicating how many are present.

vi. has a value that is stored as value data formatted into integer form and stored at a location in the item that is addressable by that field's fieldnumber.

3. Links
  a. A field may be a link that contains the itemnumber of another item.
  b. Links may be included in items to reference other items and thereby create:
    i. virtual fields; that is, the fields in a linked item may be addressed by fieldnumber and used like the fields in the item which contains the link.
    ii. relational keys; that is, an itemnumber may be placed in any item and used as a relational key to create one-to-many and many-to-one relationships just as relational keys are used in a relational database.
    iii. item pointers that create parent-child relationships, linked lists, hierarchical tree structures, and the like, By way of example, itemtypes which include left and right links may form the nodes of a binary tree.

These and other objects, features and advantages of the invention will be better understood by referring to the following detailed description. In the course of this description, reference will frequently be made to the attached drawings.

DETAILED DESCRIPTION

Figure 1:
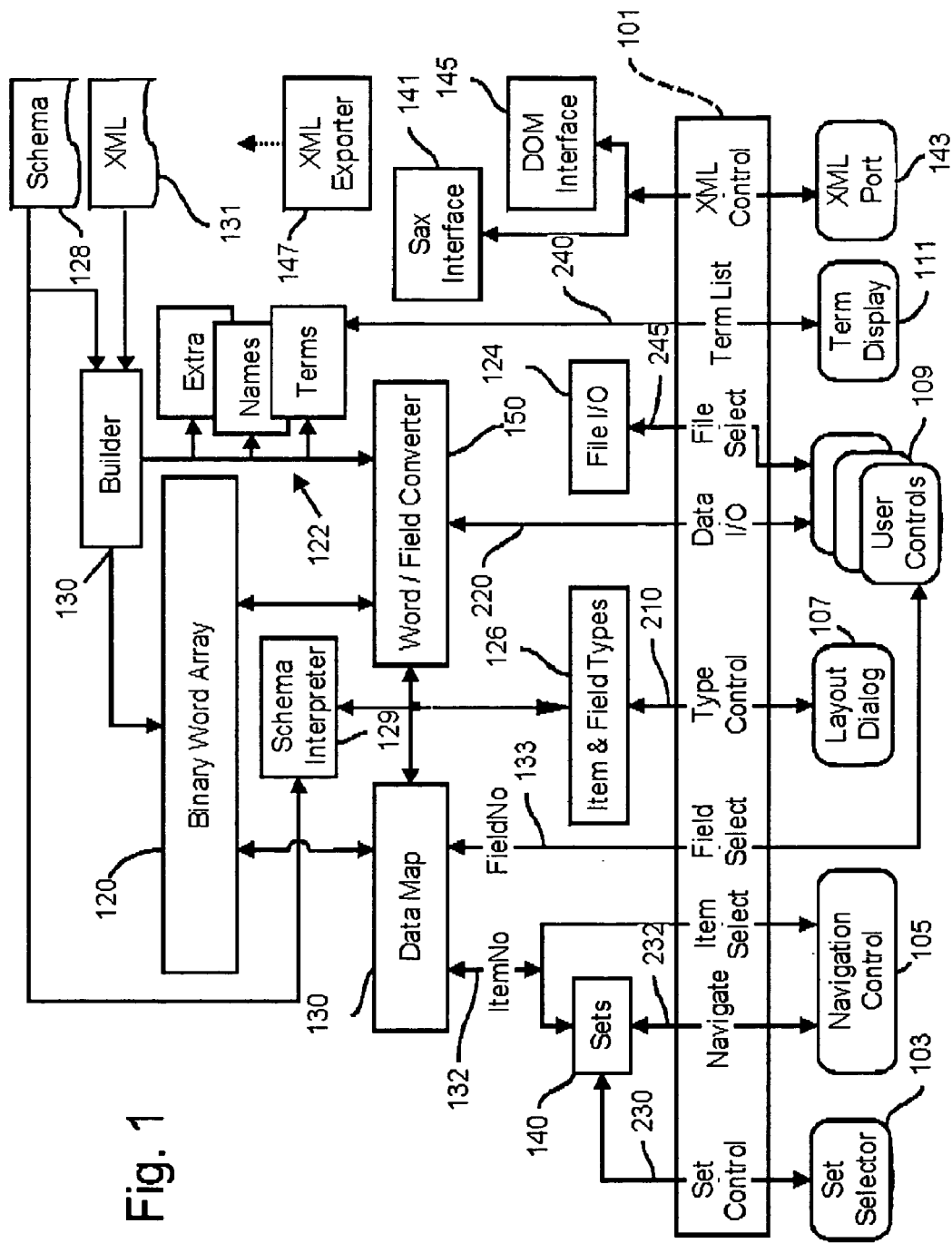
FIG. 1 is a block diagram of an "engine" which operates as a database management system DBMS) that stores data in a memory array of fixed length integer values in accordance with the invention and that serves client applications through an application program interface (API).

The detailed description which follows describes a general purpose database management engine which implements the novel features of the invention. The database engine, as seen in FIG. 1, presents a variety of interface functions to client programs via an application program interface (API) depicted by the rectangle 101.

Client application programs exchange data and control information with the engine by calling the routines and accessing the data exposed by the API 101. The client programs incorporate user interface controls which request services via the API. These controls, whose function will be described below, may include a set selector 103, a navigation control 105, a data structure definition control such as the layout dialog 107, a variety of user controls which create, modify and delete stored data as indicated at 109, and a term listing display 111.

The database engine stores data in sequences of fixed length integer values placed in an addressable store 120, and in separate metadata structures, including associated string tables indicated generally at 122 that store character strings specified by some of the integer values. The database engine is a memory resident system; that is, all of the data and metadata for the engine reside concurrently in RAM (or virtual RAM) storage, and these data structures may be efficiently loaded from and saved to persistent storage between sessions by a file I/O control 124.

The stored metadata further includes data type information stored at 126 which is accessed using item type identification values stored with the value data and also represented in integer form. The data type information at 126 is used to select processing methods appropriate to the data type stored, to indicate the size of each data element to facilitate high speed data scanning, data space allocation, data moves, and to identify which child data elements are within the scope of a parent element. The information in the item and field type data definition structures stored at 126 may be automatically built by interpreting XML schemas seen at 128 using a schema interpreter 129, or by interpreting an XML document 131 which has not been defined by a schema as that document is being parsed and converted into numerical form by the builder seen at 130, or by accepting field and item type definitions directly from user via the API 101 from the dialog layout control 107.

In the DBMS engine, a sequence of one or more integers is used to represent the character data in natural language text, including the natural language text data (character data, element and attribute names, etc.) in XML documents. Thus, character data can be persistently stored in persistent storage at 120 in one or more integer arrays and can be loaded into memory by the file I/O control 124 and processed in its integer form. Importantly, because each word in the natural language text is assigned an unique integer value, high speed text search and retrieval functions are performed by fast integer array routines. For example, a search for fields or nodes containing the word "parser" can be performed by scanning the array for the unique integer value which signifies "parser," a process which is substantially faster than character based searching or using persistently stored index tables.

The system further allows client application programs to directly access the string tables via the API to provide the user with the ability, for example, to display sorted listings at 111 of the terms used in the database so that informed search queries may be formulated in advance of data scan operations.

The database engine to be described in detail below is a general purpose database program which stores natural language text and a rich variety of other typed data in an array of integers subdivided into data elements called "items." An item can function either as a relation (table row) in a relational database organization, a record in a flat-file database, a node or object in a hierarchical or tree-structured object-oriented database, or as an independently addressable data structure which can be directly addressed an manipulated via the API 101. Each item is designated by an item number and holds a collection of one or more numbered, predefined, fixed or variable length fields. Each field holds typed data and is specified by a field number. The data in any field in the database can be directly addressed by concurrently specifying its item number at 132 and its field number at 133. Any numbered field can be defined to be included in any defined item type, and items of different types which share common fields can be processed polymorphically using the shared fields.

Ordered collections of items called "sets " may be created by query (filter) mechanisms and stored at 140. The filter identifies selected items based on a defined criteria to create a set (file) of itemnumbers which may be persistently stored. Methods are provided for logically manipulating, sorting and combining such sets in variety of ways supporting both relational and object oriented data manipulation, and the API 101 exposes these methods to client applications which contain the appropriate user interface controls such as the set selector 103.

The database engine to be described includes mechanisms for storing and manipulating XML documents and provides an API for processing those documents in accordance with the interface specification for the Document Object Model (DOM) as defined by the Word Wide Web Consortium (W3C), or by means of a SAX (Simple API for XML) API. The SAX interface seen at 141 makes data available to client application programs as a sequence of parsing events by processing the item data stored in the integer store 120, and by converting the character text tokens and item type data into character format for use by the client program's XML port seen at 143. Alternatively, the client program may call the DOM interface seen at 145 to read and write the XML data as a stored hierarchical structure. The SAX and DOM interfaces 141 and 145 represent alternative mechanisms for manipulating stored XML data which may be directly manipulated by the item/field addressing mechanism used for all types of data, including XML.

An XML document as seen at 131 may be automatically validated and mapped into the item/field integer array structure by the builder 130 after first using the schema interpreter 128 to translate the metadata in an applicable XML schema 128 into the metadata used by the database engine to manipulate items and fields. Note that the schema 128, being expressed in XML, may also be stored in the database using the builder 130. As described in more detail later, the builder 130 imports well-formed XML documents expressed as character data by parsing that data in accordance with the XML production rules into node data represented by items and fields encoded as integers in an integer array.

The database engine provides highly efficient storage and manipulation of XML data as an in-memory database, and can support both the DOM and SAX APIs, as well the direct API exposed by the engine, to that application programs may directly manipulate the XML data in its integer array and string table forms. Once converted into the integer array and metadata format contemplated by the invention, XML documents can be much more compactly stored and much more rapidly processed than by conventional character based systems.

The string tables 122 include a termtable for storing tokenized text strings, a name table for storing element and attribute names, and an extra table for storing miscellaneous string values, such as URIs. Each is implemented by a termstore object, as detailed in the unit terms.pas in the program listing appendix, which stores null-terminated character strings (called "terms") and provides bidirectional conversion between unique terms and their corresponding term numbers (16 bit unsigned binary integers). An illustrative, simplified version of the termstore mechanism may be found in the program listing appendix in the unit named textwork.pas.

A termstore may be used directly to store character string data which may contain anything other than a null character and this "term" may thereafter be identified by a single termnumber. Text (a term sequence) is manipulated by termhandler objects, to be discussed in more detail below, which use a termstore in combination with parsing and assembly routines which may differ depending on the type of text being stored (all uppercase characters, HTML, rich text format, etc.) A termstore also provides sorted term listings through a dynamically created array of term number which lists the terms in sorted order. This termstore exposes an array of term numbers called "sorted" which is rebuilt by the procedure sortTerms after any new terms are added to the termstore.

The termstore object stores a table of strings in character form which is addressed using the pointer tnew, tnew^ stores terms previously stored on disk plus new terms added during a session. The terms in tnew^ are separated by null characters. New terms added later are added to the end of tnew. At end of session, or when a save is requested, old and new terms are both written to output stream and are fetched as a group the next time the program runs. When tnew runs out of room, it is expanded automatically to make memory space available for new terms.

A termstore exposes a rich set of variables and methods for use by a client application program. These interface methods use private variables and procedures listed below, followed by a listing of the "public" methods and variables which are available to external routines which use a termstore object.

| Name | Description |
|---|---|
| *Termstore Private Data and Methods* | |
| tnew | Pointer to allocated space holding string table |
| tnsize: integer; | The allocated size of tnew^, the string table. |
| work: array[0...$ffff] of char; | A holder for output text built by numsbytes |
| nextchar: integer; | Holds location in tnew^ of next available free pchar term space |
| top_loc: integer; | Holds largest termnumber that will fit in the loc^ array |
| left,right: ptreearray; | Binary tree pointers used to locate terms in tnew^ |
| sorted: ptreearray; | After sortterms executes, holds sorted termnumbers |
| sortsize: integer; | Holds size of sorted^ in words |
| sortpsn: integer; | Holds current sort cursor position. Used by next and prior |
| root: array[0...255] of word; | Holds termnumber of first term beginning with each character. Used to speed binary tree search. |
| termset: array[0...255] of boolean; | Termset[n] true if n is ordinal value of selected characters. |
| procedure bumpCount; | Increments Count and insures space in loc^ etc. |
| procedure AddpcharToTreeAt(const termstart: integer; const j: integer); | Puts termstart into loc^ at j and sets left and right pointers to find the term beginning at tnew^ [termstart] |
| procedure expand; | Gets more tnew^ space, expanding by charblock bytes |
| function foundpchar(const target: pchar): word; | Returns stop if not stored else returns termnumber |
| procedure SortTerms; | Builds sorted array of size sortsize |
| *Termstore Public Data and Methods* | |
| loc: plocationarray; | Array of pointers to all terms in tdisk^ and tnew^ |
| Count: integer; | Index to next empty slot in loc^ - and count of the total number of terms in the termstore |
| function load_from_file(const fin: file): boolean; | Loads the termstore from the named file on disk. |
| function save_to_file(const fout: file): boolean; | Saves the termstore to a named file on disk. |
| function punctuation(const n: word): boolean; | Returns true if the term identified by the token n is punctuation separating alphanumeric strings in the original text. |
| function getterm(const n: word): pchar; | Returns the address of the null terminated term string corresponding to the token n. |
| property term[const n: word]: pchar; | A read only property which uses getterm; |
| procedure numsbytes(const numsin: pwordzone; const numcount: integer; var textout: pchar; var bytecount: integer); | Converts a sequence of numcount numerical tokens in the array numsin to a null-terminated string textout having the length bytecount |
| function bytesnum(const addterm: pchar; const termlen: integer): word; | |
| function pcharnum(const x: pchar): word; | |
| function stringnum(const s: string): word; | The functions bytesnum, pcharnum and stringnum convert single strings into the appropriate token value by using the binary tree to locate matching strings, or by appending the string if new to the termstore and returning the next available token value assigned to the new string. |
| function first: pchar; | Returns first string in alphabetical list and sets list cursor at the start of the sorted list |
| function last: pchar; | Returns last string in alphabetical list and sets cursor |
| procedure gotonum(n: word); | Sets cursor to a position in the list (e.g. gotonum(count div 2) goes to the middle of the list |
| function getcursor: word; | Returns current cursor location |
| property sortcursor: word; | Read/write cursor location |
| function at_or_firstafter(target: pchar): pchar; | Sets list position and returns string at or after target |
| function next: pchar; | Advances list position and returns next term in list |
| function prior: pchar; | Backs up list position and returns prior in list |
| function termatsortpsn(const psn: integer): pchar; | Returns term at designated position in the list |
| function tokenatsortpsn(const psn: integer): integer; | Returns the token value at a designated position in sorted list. |

Natural language text is represented by a sequence of tokens which represent substrings in the original text. Each substring, except a single space which separates alphanumeric terms, is converted into a numerical token. Single space punctuation is not tokenized but its presence is implied between any two consecutive tokens which represent alphanumeric terms. The procedure numsbytes noted above converts each numerical token in a token array into its string equivalent which is then concatenated onto the end of the previously created string. When two tokens in a row represent alphanumeric strings, the implied space is inserted between them.

The termstore has no means for converting natural language text into a sequence of tokens. That task is performed by the object texthandler in the unit text.pas set forth in the program listing appendix. Texthandler includes a parsing routine for subdividing natural language text into a sequence of substrings constituting alternating alphanumeric terms and intervening punctuation. The texthandler object exposes routines which accept text in various forms and each returns a pointer to a pitem record numwork^ of size worksize which is overwritten by any subsequent routine which builds a numwork output. Similarly, routines which accept numerical arrays write equivalent output text to charwork^ which has an allocated size=charworksize. These methods present the interfaces listed below:

| Texthandler Public Methods | |
|---|---|
| Name | Description |
| function bytesnums(const tin: pchar; const tinlen: integer): pitem; | Returns a pointer to a pitem record with a leading size integer and accepts a null terminated input string tin of length tinlen) |
| function pcharnums(const tin: pchar): pitem; | The pitem returned is numwork and is valid only until next call to pcharnums |
| procedure bytes_to_nums(addterm: pchar; termlen: integer; const target: pitem); | Used to write output to a designated, pre-allocated pitem^ target. |
| procedure pchar_to_nums(x: pchar; const target: pitem); | Same as above but input is null-terminated string. |
| procedure string_to_nums(s: string; const target: pitem); | Same as above but input is a Pascal string; |
| Text Parsing | |

The function bytesnums parses the natural language text into alternating alphanumeric characters and intervening punctuation using a method which can be described as follows. First, sets of characters are defined as follows:

| Set | Members |
|---|---|
| leadset | ['A' ... 'Z', 'a' ... 'z', '0' ... '9', '^', '#', '$'] |
| midset | ['A' ... 'Z', 'a' ... 'z', '0' ... '9'] |
| endset | ['.', ','']; |
| trailset | ['A' ... 'Z', 'a' ... 'z', '0' ... '9', '%'] |

The parsing method examines each character in the input text string in sequence and identifies terms which must begin with a character in leadset, must have a character in midset at all positions thereafter except the for the last trailing character which must be in trailset, with one exception: a single character in endset is permitted to be imbedded in the term, but two endset characters in a row are not permitted, nor is an endset character permitted as the first or last character in a term. Thus, the following are all valid terms:

Jones, J 37%
$123.45        ^Flag23
Mary           J. Doe
123           Q23

The selection of characters in the various sets is a design choice that might be varied in different applications and, for this reason, the functionality of texthandler was separated from the termstore to permit different parsing mechanisms to be used. The leadset could be expanded, for example, to add the underlined character '_' or the colon ':', both of which are commonly used to as acceptable leading characters in programming languages. The endset could similarly be expanded to include the hyphen '-', the colon ':', and the slash marks '/' and '\' to join the substrings of hyphenated words, qualified names joined by a colon, and full pathnames.

It should be noted that altering the manner in which words and punctuation of natural language text is parsed by changing the makeup of the sets can optimize the degree to which compression is achieved without seriously affecting the ability to locate specific words by performing token searches. A search can be performed for any string by tokenizing the search string in the same way the original text was tokenized. For example, to search for the string:

"a dog and a cat"

The search would be performed for the sequence of three tokens for "dog and a"(the spaces are implied rather than tokenized), and a test would then be made to determine if the token before dog represented a term ending in the character "a" and to determine whether the token after the token for the last "a" represented a word beginning in "cat" (since the string "a dog and a catfish" contains the desired string).

Term Storage Using a Binary Tree

In order to tokenize the substrings generated by the parsing method described above, a mechanism is needed for comparing each substring with all of the previously generated substrings and returning the token assigned when the first substring was assigned. Because this search must be conducted for every parsed substring, it should be very efficient.

Figure 2:
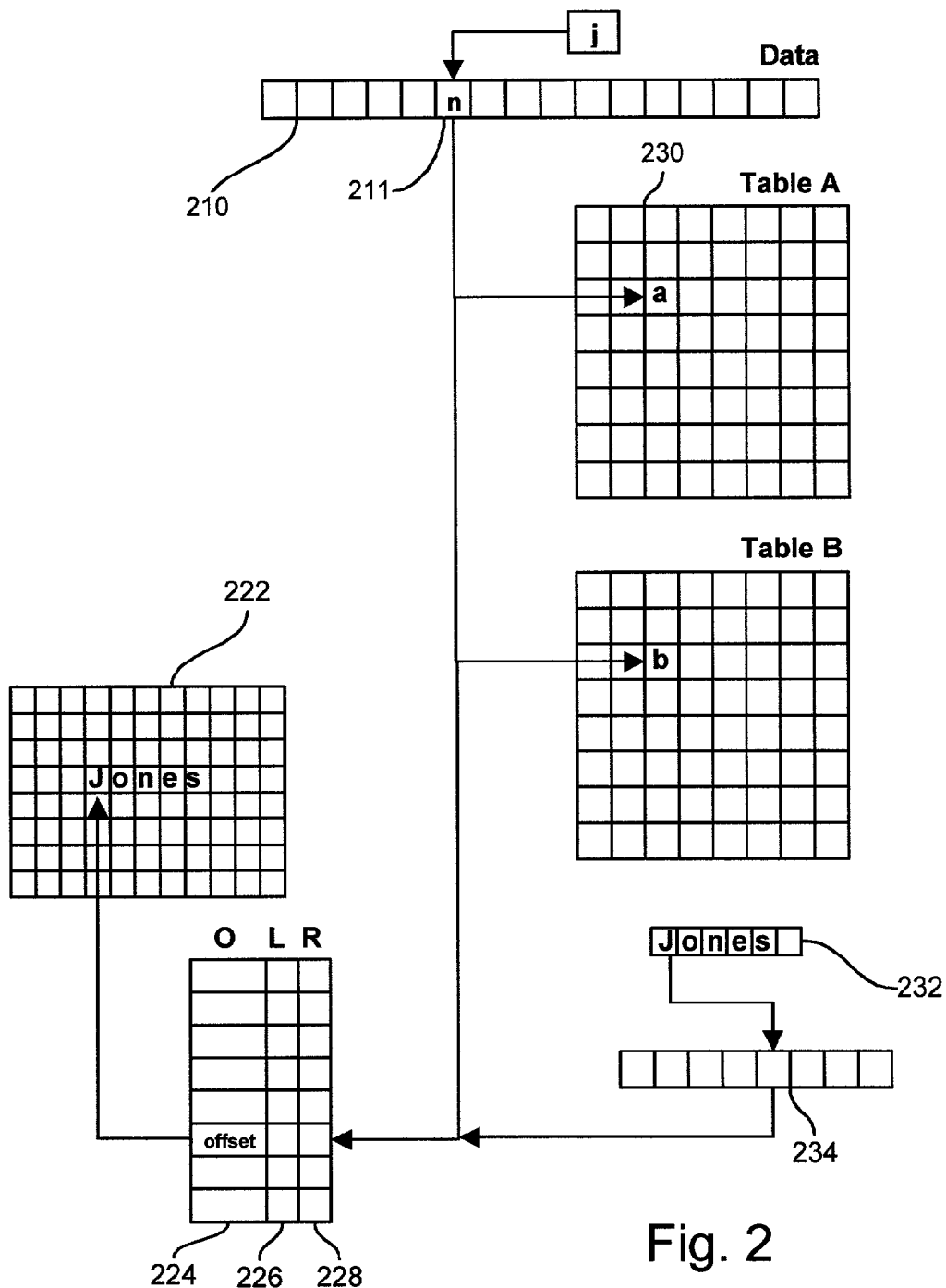
FIG. 2 is a block diagram illustrating the data structures used to convert character strings to integer token values.

The preferred mechanism for performing the conversion of substrings to tokens uses a binary tree structure with vectored entry points that employs the data structures illustrated in FIG. 2. The characters for each stored term are placed in an array of characters (tnew: pchar) seen at 222. A table named "o"(for offset) seen at 224 holds the offset value at which each term begins in the character array 222. Left and right binary tree pointer tables named "L" and "R" respectively are shown at 226 and 228. The L, R and O tables are all indexed by the termnumber value (e.g., the value "n" obtained from the data array Data. Thus, the following example expressions as written in Pascal have the meanings listed:

| Expression | Description |
|---|---|
| Data[j] | holds "n", the termnumber for the substring "Jones" (see 210) |
| tnew[o[n]] | specifies the null terminated character string "Jones" which is located in tnew at the offset address given by o[n]. (see 222–228) |
| L[n] | holds the binary tree left pointer for 'Jones'; that is, holds the termnumber for a substring that was placed in the termstore after 'Jones' and which has a value less than 'Jones' but greater than any other previously received substring which is less than 'Jones'. (see 226) |

In order to speed binary tree searches, a table of 255 termnumber values called "root" and illustrated at 234 is used. The root table 234 is indexed by the ordinal value of the first character of the term to be found in the tnew character array. When each substring is to be converted to a token value using the stringnum( ) or pcharmum( ) methods, a test is made to determine if the root table holds a vector value. Thus, assuming that the term "Jones" was the first term placed in the termstore which began with the letter J, the cell root[ord('J')] holds the termnumber for 'Jones' and no further search is required. When additional terms beginning with 'J' are stored, the binary tree node at root[ord('J')] holds the left and right tree pointers needed to perform the search for a matching word. The use of the root table can save as many as eight binary tree tests for each search, thus substantially speeding search operations by narrowing the field of search to only those terms which begin with the same letter.

In order to use the binary tree pointers to provide a sorted listing of terms, a recursive routine called dump is used to walk through the binary tree, transferring termnumber in sorted order into the result array called sorted, as illustrated by the following routine.

```
var j: integer; { index to sorted: array[0. .max] of termnumber }
procedure dump(p: word);
begin
        if p < > stop then
        begin
                dump (left^ [p]);
                sorted[j]:=p;
                inc(j);
                dump (right^ [p])
        end
end; { recursively transfer in sorted order }
```

Because the terms actually exist in separate trees, each stemming from a vector in the root array, the full list of terms is placed in the sorted array by calling dump to recursively list the contents of each subtree in alphabetical order, as illustrated below.

```
for i:=0 to 255 do begin
        if root[i] < > stop then dump(root[i]);
```

See the method sortterms in the termstore object program listing for additional details.

Fast Serch Mechanisms

The representation of natural language text as a sequence of tokens which represent language words and intervening punctuation as contemplated by the invention permits very fast text searches to be performed using array-based logic. This mechanism is illustrated in FIG. 2 of the drawings.

In FIG. 2, an array of numerical tokens called "Data" is shown at 210. The Data array 210 is indexed so that the value in the array cell 211 at the index location j is the value n which can be fetched using the Pascal statement n:=Data [j]. If it is desired to search for the word "telephone" in the Data array 210, the token value of the term "telephone" can be fetched from the termstore using the function termnum. This, the following code permits a high speed search to be performed.

```
target:=termnum( 'telephone' );
for j:=0 to datatop do if Data[j] = target then hit_handler(j);
```

The routine above calls the utility procedure hit_handler and passes it the location in Data of any cell holding a token signifying the term "telephone."

In most text searching systems, a problem arises when the original data is improperly entered. Thus, the search above will not identify the terms "telephone" "telephones" or "telefon". Because all of the terms in the termstore can be listed in alphabetical order, the user can simply first request a listing of all terms beginning with the letters "tele" which would reveal the variations which the user can include or exclude from the search.

It is also useful to know the number of times each term appears in the database. That can be accomplished using a procedure like the one illustrated below which uses the Table A at 230:

```
fillchar(tableA,sizeof(tableA),0); {zero all cells of table A}
for j:=0 to topdata do inc(tableA[Data[j]]);
```

The routine above scans the Data array and places a count at each location tableA[n] which indicates the number of times the term numstring(n) occurred in the text. This count can then be displayed with the termlist to facilitate the formation of search requests. It should be noted, of course, that not all integers in the integer store 120 are text tokens. Accordingly, when scanning each item, it is necessary to walk through the fieldmap for that itemtype and then count only the terms in those fields which are of type text. Note, that, in the same way, when searches are conducted, the search can be made only in those itemtypes and/or fields selected by the user. Thus, a search can be made for items in which the field named "Title" contains selected terms.

Next, assume a search is to be made for any occurrence of the term "mountain" within six terms of the term "molehill". Such a search can be performed as follows:

```
var ax,bx,cx,dx: integer;
ax:=0; bx:=0 { zero two variables}
cx:=stringnum('mountain');
dx:=stringnum('molehill');
for j:=0 to datatop do begin
        if Data[j] = cx then
                begin
                        bx: =j;
                        if (j–ax) < 7 then handle_hits(j,ax)
                end;
        if Data[j] = dx then
                begin
                        ax:=j;
                        if (j–bx) > 7 then handle_hits(j,bx)
                end
end;
``` where the utilization routine receives the location of both the term "mountain" and the term "molehill" in whatever order they might occur.

A powerful technique which can be used for interactive searching gives the user the ability to perform a search, obtain a rather long listing of items which match one or more search terms, and then select an item on the list which appears to be the "best" result, and then request that a search be made for other items in the database which are most like the selected item.

First, using the procedure noted above, count values for all of the terms in the database can be placed in tableA. Next, table B is zeroed, and thereafter the token values found in the chosen "best" item can be scanned and each token value used to place a weight value in the corresponding cell of table B using the routine illustrated below.

```
for j:=beststart to bestend do
    inc(tableB [Data [j],weightval(tableA[Data [j]]);
```

The routine above increments the tableB cell by a weight value inversely related to the total count in the database of each term. This is done because low frequency words should be assigned greater significance than high frequency words, and the words which appear frequently in the "best" item should be assigned a greater weight than the words which appear infrequently.

After the weight table B is loaded, it is merely necessary to perform the following scan of the text tokens for each item:

```
for ino:= 0 to itemstore.count do begin
    itemweight:=0;
    For j:= textstart(ino) to textend(ino) do
        inc(itemweight,tableB[Data[j]];
    KeepInTopTen(ino, itemweight);
end;
```

As illustrated by the pseudocode above, an itemweight value is rapidly computed for each element consisting of the weighted sum of the significance of all of the terms in that item. The functions textstart and textend provide the start and end positions of the text field of interest in each item designated by ino. The item number and its calculated itemweight is then passed to a method called KeepTopTen which keeps a list of the ten items having the largest itemweight so that those items can be displayed to the user at the end of the search. Note that this process occurs by high speed integer array addressing mechanisms and can be done is a few seconds or less even for very large databases. A comparable search based on character text scanning methods would typically not be attempted because of the processing burden imposed.

The Integer Array RDBMS

The database engine stores value data in an integer storage unit 120 which stores sequences (arrays) of addressable, fixed length binary words, each of which preferably takes the form of 16 bit unsigned integer storing a value in the range 0–65,536. In the illustrative program listing in the unit named item.pas, integer data is persistently store in mass storage as a single array of integers, and integer data which has previously been persistently stored is read as a block into a single integer array at a location specified by the pointer variable idata. The data array idata^ at 120 is accessed through an array of item pointers (in the data map 130) at a location specified by the pointer variable ip. An individual item can then be found using ip^ as a lookup table as described later. New or modified items are allocated on the heap, and a pointer to the new item is placed in the ip^ lookup table.

In the illustrative program listing in the appendix found in the unit named items.pas, the functionality of the engine is centered in a single object called an "ItemStore" which is shown as the binary word array 120 in FIG. 1. The principle data structures used by the ItemStore object are defined in the unit named xglobals.pas.

As used herein, unless otherwise apparent from the context, the terms "word" and "integer" are both used to refer to the data values stored in the array 120. To avoid confusion, the "words" that are composed of alphanumeric characters in natural language text date will be called "terms"(as are the punctuation characters that appear between alphanumeric characters in the text). Some of these integers in the integer storage unit 120 are token values which uniquely identify a string ("term") stored in a string storage object seen at 122 which is called a "termstore" as described above.

The 16-bit size of the integers stored in the array 120 was selected for several reasons. For machine processing efficiency, the integer size should be chosen as an even multiple of the 8-bit size used in conventional byte addressable RAM. A 16-bit integer (word) permits up to 65,536 different terms to be specified in a string table, which has been found to be a vocabulary of adequate size to store all of the unique terms used in a large database consisting primarily of text data. Although a 32 bit integer size could also be rapidly processed, since most modem computers employ an ALU register size and memory bus widths of 32 bits or larger, the 16 bit integer size yields a data structure half a large, and the 16 bit size permits a termcount that is more than adequate for even large text databases. Because of the significant advantages resulting from storing the entire database in RAM as an integer array (particularly the avoidance of index structures which are rendered unnecessary since high speed RAM array searches can be performed more rapidly than fetching an index file from mass storage. Nevertheless, it is recognized that, as RAM memory costs continue to be reduced, a larger integer size could be used, permitting a correspondingly larger vocabulary to be used.

Note also that the sixteen bit integer size is also adequate to serve as a size indication for items, nodes and other data structures. Where larger sizes may be required, the system creates a data type that employs 32 bit double integer size data to be stored. Alternatively, data may be subdivided into zones, each of which has its own term storage tables, in which case data values would be indicated by the combination of a zone number, an item number within that zone, and a field number within the designated item. Metadata stored at 126 to define the item and field types would be shared among all zones.

It should also be noted that the character data stored in the term tables typically takes the form of conventional 8-bit ASCII coded characters. Database systems which support natural language text data in other languages may alternatively store "terms" as 16-bit UNICODE characters. XML storage systems which fully support the W3C XML specification should accordingly include termstores which are capable of storing 16 bit character strings in the string table. In Object Pascal as marketed by Borland, 16 bit "wide strings" may be substituted for the conventional strings of eight-bit characters to support UNICODE characters and the like.

The data in the integer array is logically subdivided into "items," each of which represents a relation (such as a table row in a relational system), a record in a flat-file system, or a node in an tree-structured object system. Unlike the rows in a conventional relational table, however all of the items of a given item type need not be in single, separately stored table. Instead, the items of a given item type may be freely intermingled with items of other types throughout the integer array 120.

When XML is mapped into the item storage system, attributes are stored as fields in an item which stores the element holding the field, or an element in which that element is nested. Elements which are simple types, or which are recurring simple types, may also be stored as fields in an item representing an element which such element(s) are nested. The mapping of elements and attributes is handled by the schema interpreter 129 seen in FIG. 1, or by the builder 130 when there is no schema, and the metadata which maps the elements and attributes into the items is stored in a data map seen at 148. The schema seen at 128 in FIG. 1 may take the form of a Document Type Definition (DTD) as specified in the XML in the World Wide Web Consortium's Recommendation entitled "Extensible Markup Language (XML) 1.0" (2nd edition 6 Oct. 2000 or an XML schema as defined by the World Wide Web Consortiums's recommendation "XML Schema Part 0," a nonnormative document intended to provide an easily readable description of the XML Schema facilities, and in "XML Schema Part 1: Structures" and "XML Schema Part 2: Datatypes" which together provide the complete normative description of the XML Schema language. Note that XML schemas provide the datatypes of data represented by character text in XML documents to be specified, which in turn permits XML element and attribute typed data to automatically converted into a binary form suitable for more rapid processing and more efficient storage as explained later.

Each item is numbered and may be directly addressed using its item number. Moreover, all of the fields in a given item are numbered and the data in any individual field may be directly addressed using the combination of its item number and its field number. This addressing is accomplished by the data map 148 which is capable of converting the combination of a valid item number and a valid field number into the offset address of the beginning integer location in the integer store 120 where the data in that specified item is stored.

Items may be organized into "sets" which consist simply of an ordered collection of item numbers which are gathered in accordance with some criteria. For example, a set corresponding to a relational database "table" could be formed by collecting together all items of the same item type in one set. The items in a set need not be of the same type, however, but may be collected in a single set based on the fact that they share some common attribute. Thus, items of type "apple" and of type "orange" may be collected together to form a set named "treefruit." Importantly, new item types may be derived from existing item types and both may be processed by polymorphic methods commonly used in object-oriented systems. These and other features of sets, and the mechanisms provided to create, sort, combine and process the members of such sets, will be described in more detail later.

As indicated at 140 in FIG. 1, sets are also used to selectively navigate and display data stored in the system. Accepting a set designation from the set selector 103, a given set (all or a subset of the items in the integer store 120) become visible to the user. Sort commands may be issued to reorder the items in the set as desired (e.g. sorted chronologically based on a shared date field). The connected navigation control 105 may then be used to select a particular item number in the set, and an edit control at 109 may then be used to fetch and display all or selected ones of the fields in the selected item for display by adding a field number to the item number from the navigation control 105.

The data map 148 converts the item and field numbers into an array location which is used to access the integer data from the array 120 and pass it to a binary formatting unit 150. The unit 150 is provided with the data type of the data stored at the addressed integer location and converts the integer data into a format desired by the external device (for example, data of type "date" may be converted into a displayable string representation "Sep. 4, 1938" which is passed to the edit control 109. As data is being supplied from the application for storage in the ItemStore, the binary formatting unit performs the inverse transformation, converting displayable character data or typed data from the application program into 16 bit integer format for storage in the array 120.

The application which uses the ItemStore engine may define the item types (row or node contents) needed desired for a particular application. Thus, a layout dialog box 107 displayed by the application program may be used to accept from the user the definition of the different fields and their respective data types to be included in a given item type. Alternatively, as previously noted, when XML data is stored, the type information may be obtained from an applicable XML schema.

The edit controls 109 in the application program may add, delete and modify the data in any field by specifying that fields item and field numbers, displaying and modifying the existing data, and writing the new or modified data into the integer array 120, adding any new terms to the termstore 122 if present.

The Itemstore Object

The ItemStore object is an encapsulated in-memory general purpose database which could be packaged as a component for use by a rapid application development environment, a compiled or compilable unit, an ActiveX component, a dynamic link library, or any other form in which it can make its services available via its application program interface 101.

The Data I/O API interface indicated at 220 in FIG. 1 exposes the FieldStr[ino,fno]: string property which accepts and returns a string representation of data specified by itemnumber ino and by fieldnumber fno. The number of items that can be stored in the database is limited only by the size of available memory which is dynamically assigned as needed.

Each numbered field has a name and datatype specified by the user. The defined fields have names specified by the property fieldname[fno]: string and data types which are specified by the property fieldtype[fno]: ftype. The data types available using the ftype value include both common data types and additional data types unique to this system. The W3C Schema specification, XML Schema Part 2: Datatypes, W3C Candidate Recommendation dated Oct. 24, 2000 provide for primitive data typing, including byte, date, integer, sequence, SQL & Java primitive data types, etc., as well as additional types that are adequate for import/export from database systems (e.g., relational, object, OLAP). Moreover, the schema recommendation allows the creation of user-defined datatypes. As these datatype standards evolve and are adopted, the item and field type conversion system should accommodate at least the "built in" data types specified by the schema recommendation by built in conversion routines which would translate data in each built-in type into a binary format suitable for storage in the integer store 120, and should convert integer format back to its standard datatype formats. The object named "numerals" found in the unit numera.pas illustrates a general purpose format conversion object which allows numeric data to be converted between formatted string representations and a variety of binary numeric data types including integers and floating point values of various sizes.

Using the type conversion functions of the converter 150, an ItemStore object can accept and retrieve data in either string form or in as typed data (boolean, word, integer, single, double). String format is the form used by interface components; however, within the itemstore, data is always stored in a binary format having a structure defined by the data type (ftype) specified by the user for the particular field holding the data. Where values, such as dates and numeric quantities, can be represented in different string formats, the property FormatStr[ino,fno,format]: string can be used in place of FieldStr to insert and retrieve formatted data, with the format parameter indicating the form in which the string is to be read and written.

Thus, for example, a date may be stored using the format f_yrmody as '930421' and later retrieved using the format f_longdate as 'Apr. 21, 1993'. Attempts to use a defined format which is incompatible with a defined field produces an error message as does an attempt to enter a string which cannot be successfully converted in accordance with the field's declared type or format.

An item (record, node, element, etc.) may only contain those fields which have been included in the itemtype to which the item belongs. Any attempt to insert data into an item whose itemtype doesn't include the designated destination field will generate an error. However, a new field may be added to, or removed from a given itemtype at any time using the property Field_in_Type[itno: itype; fno: fielnumber]: boolean (which is set to true if fieldnumber fno is in the itemtype itno). Adding a field which did not previously exist in an itemtype restructures all items of that type to include the new field (empty). Removing a field from an item generates a warning indicating the extent to which data will be lost by the alteration. If the field makeup of an itemtype created by adding or deleting a field from an itemtype matches an existing itemtype, the user will be so advised and may adopt that existing itemtype designation, or may choose another, so that the items will have different itemtypes even though they have identical field structures.

Whenever a new itemtype is created, the user will be asked to give it a name (if it doesn't already have one). An item's item type is specified by the property ItemType[ino]: itype; The assignment of a new itemtype to an existing item having a different itemtype is permitted, but creates a restructuring of the record by adding and/or deleting fields to achieve the newly requested field structure. When data would be lost, the user is asked to confirm that the deletion is permitted.

The ItemStore object presents a two dimensional array of data cells indexed by Ino and Fno Data may be accessed through Data I/O API interface 220 using the following properties:

FormatStr[Ino,Fno,Format]: string;
DataPtr[Ino,Fno]: pointer;

The properties of fields are defined and accessed the Type Control API interface 210 using the properties:

Fieldname[Fno]: string;
Fieldtype[Fno]:

The field layouts of items are defined and accessed via interface 210 using the properties:

ItemTypeName[itype]: string;
FieldLocation[Fno,Itype]: LocationCode;

The itemStore is persistently stored on disk using the property of the File Control 124.

Pathname: string

To facilitate item selection and navigation, the ItemStore further allows items to be grouped into sorted sets where the members of the set can be filtered and combined with other sets. The Set Select interface 230 allows the currently active set in an ItemStore object to be selected and accessed using the property:

ActiveSet: Integer; (see Set Membership, below)

Each ItemSet object exports a cursor property via the Navigate interface 232 which is in the range 1 . . . last item (accessible using the function itemset.lastitem: integer):

The active set cursor can be loaded with any value from 1 . . . last item to select a particular item in the set as the active item. In addition, the navigation interface 232 allows a particular item in the active set to be selected using the exported navigation functions First: integer;
Prior: integer;
Next: integer;
Last: integer;

all of which both move the cursor (if possible) and return the cursor position value after the movement is completed.

The principle functions exposed to application programs by the ItemStore 120 are depicted in FIG. 1 of the drawings and are summarized in the outline below. Each interface is described using Pascal. The notation used conforms to that used in the Object Pascal language employed in the Delphi development suite marketed by Borland. The non-standard data type employed in the interface definitions are defined in the Appendix in the globalsx.pas unit. Note that, in the definitions, the symbol "integer" refers to a 32 bit Pascal signed integer and the term "word" refers to a 16 bit Pascal unsigned integer.

4. ItemType Handling (Line 210 in FIG. 1)
   a. property ItemTypeName[const itno: itype]: string;
   b. property ItemType[const ino: integer]: itype;
   c. property FieldInType[const fno: fieldnumber; const typeno: itype]: boolean; {FieldInType property is true when fno is assigned to typeno}

5. Item Data I/O (Line 220 in FIG. 1)
   a. function itemcount: integer; {returns number of items in store}
   b. function addempty(const is_type: itype): integer; {allocates space for an empty pitem of requested itemtype, and calls additem to add it to the itemstore. Thereafter, use putfield to insert data}
   c. function deleteitem(const ino: integer): boolean; {frees pitem, sets ip^[ino]:=nil, and sets emptyslot:=true;}
   d. function exists(const ino: integer): boolean; {false if no such item}
   e. function lastitem: integer; {returns highest used itemnumber}
   f. nextitem: integer; {indicates total number of used item slots in the store as well as the next available empty slot position in ip^.}

6. Field Type Handling Methods (Line 210 in FIG. 1)
   a. property fieldname[const fno: fieldnumber]: string;
   b. property fieldtype[const fno: fieldnumber]: fieldtypenumber;
   c. property fielddatasize[const fno: fieldnumber]: integer; (returns-1 for variable size fields. See also, fieldtype methods exported by xglobals.pas in Appendix.

7. Field Data I/O Methods (Line 220 in FIG. 1)
   a. property fieldstr[const ino: integer; const fno: fieldnumber]: string; {returns the default string representation of the data. When accepting string data, a variety of interpretable forms may be accepted as valid.}
   b. property formatstr[const ino: integer; const fno: fieldnumber; const format: f_format]: string; {accepts and returns string representations formatted as indicated by the format parameter} c. property fieldptr[const ino: integer; const fno: fieldnumber]: pointer; {provides a memory pointer to the field data. Use fixedptr or varptr below if type is known to be fixed or var}
d. property fieldsize[const ino: integer; const fno: fieldnumber]: word; {use varsize or fixedsize below if type is known to be fixed or var}
e. property fixedptr[const ino,fno: integer]: pointer;
f. property fixedsize[const fno: integer]: integer; {returns the fixed size of a numbered field}
g. property formatname[const format: f_format]: string; {the name of the format designated by a format number}
h. property slotdouble[const ino: integer; const fno: fieldnumber]: double; {sets and returns a Pascal double (extended precision numeric value) in the item and field designated}
i. property slotlong[const ino: integer; const fno: fieldnumber]: integer; {sets and returns a Pascal 32 bit integer from the designated item and field}
j. property slotword[const ino: integer; const fno: fieldnumber]: word; {sets and returns the 16 bit unsigned integer in a designated item and field}
k. property varptr[const ino,fno: integer]: pointer; {returns a RAM pointer to a variable sized designated field in a designated item}
l. property varsize[const ino: integer; const fno: fieldnumber]: integer; {returns the size on bytes of a variable sized designated field in a designated item}

8. Set Management and Navigation (Line 230 in FIG. 1)
   a. property activeset: integer; {sets (selects) and returns the set number of the currently active set. This property should be set to control which set is manipulated by many of the methods below}
   b. property activesetname: string; {sets and returns the name for the currently active set. This name is typically set by the user; for example, a set might be given the descriptive name "Expired Subscriptions."}
   c. function activesetcount: integer; {returns the current number of items in the active set}
   d. procedure first; {a navigation control. Sets the cursor to the first item in the active set}
   e. procedure prior;
   f. procedure next;
   g. procedure last;
   h. procedure jumpto(const psn: integer); {sets cursor to a numbered position in the current set. Thus jumpto (activesetcount div 2) would set the cursor to the middle of the set of items}
   i. procedure additemtoset(const ino: integer); {adds a numbered item to the active set}
   j. procedure deleteitemfromset(const psn: integer); {deletes a numbered item from the active set}
   k. procedure orset(const setno: integer); {adds all of the items in another designated set, ignoring duplicates}
   l. procedure andset(const setno: integer); {forms a new set comprising items present in both the active set and the set designated by setno}
   m. procedure notset(const setno: integer); {forms a new set comprising items present in the active set that are not also in the set designated by setno}
   n. function copyset(const setno: integer): integer; {clones the active set and returns the set number of the newly formed clone. Used to manipulate a set while retaining a copy of the original}
   o. procedure sort(const sf: sortfunction); {accepts the designation of a comparison function which specifies basis upon which two items should be sorted, and reorders the set in accordance with that function.}
   p. procedure filter(const ff: filterfunction); {a filter function has the form thisfilter(const ino: itemnumber): boolean and returns true if the item is to be included in the set extracted from another set}
   q. procedure AppendFilteredFromMaster(const ff: filterfunction); {items matching the filterfunction ff are appended from the master set to the active set}
   r. procedure Count_In_Field(const ino: integer; const fno: fieldnumber; const phit: ptreearray; var countvalue: word); {this procedure tests a text field at ino, fno to count the number of occurrences of terms having termnumbers set in the hit array phit, and leaves the resulting count in countvalue. Each termnumber slot in phit^ is individually incremented}
   s. procedure CountAll_In_Field(const fno: fieldnumber; const phit: ptreearray);{scans all occurrences of the field designated by field number and builds the counts of terms in phit^}

9. Term Display and Selection Methods (Line 240 in FIG. 1)
   a. function termcount: integer; {total number of terms stored}
   b. function TermAt(const psn: integer): string; {term at psn in the list of sorted terms}
   c. function firstterm: integer; {returns termnumber of first term in list of sorted terms}
   d. function priorterm: integer; {moves cursor toward top of list and returns term number at new cursor location}
   e. function nextterm: integer; {moves cursor toward end of list and returns term number at new cursor location}
   f. function lastterm: integer; {returns termnumber of last term in sorted list}
   g. function AtOrAfter(const target: string): integer; {searches sorted list and returns psn of matching term, or the first term after the target if no match is found}

10. Persistent Storage (File Select Line 245 in FIG. 1)
    a. property pathname: string; {Use of this property triggers file handling for saving the database to persistent storage at the end of a session, and loading the database from persistent storage at the beginning of a session. The property indicates the name of the database file on disk. When the property is set putpathname first checks to see if the requested pathname is the same as diskname, the name of the current file on disk. If so, putpathname affirmatively overwrites that file. If not, putpath name check to see if a file of that name exists on disk. If so this is assumed to be a read request, and the user is asks if the current library should first be saved to its existing disknamebefore the existing file is opened and read.}

Locally stored fixed length fields are always accessed by looking at map[ ].fixedloc[fno] which holds the location in the item where the data begins.

Linked data is always accessed through an itemnumber link which is always located within the item at the location specified in map^.fixedloc[fno] which is always a two-word long field. If the link value in the item is zero, it means no link has been added and the result is the same as if a locally stored item were empty. This means that itemnumbers must begin with 1 since the zero itemnumber indicates no link.

Varible-length, locally-stored data begins at slot[map[] .fixedloc[fho]] and has a size equal the difference between that location and the next. An empty allocated variable sized local field fnl has a zero size as indicated by the fact that slot[fixedloc[fn]]=slot[fixedloc[fnx]] where fnx is the next fixed local field after fn1. As a default, lastfield (fieldtop+1) is a dummy fixedloc field for which fixedloc[lastfield]=0 to access the itemsize field at slot[0].

An emptyitem is initialized to all zeros. When a new fixedloc field is added, the variable data is inserted at the location formerly occupied by the next higher fixedloc field whose offset is given by the current slot value; in other words, that slot value need not be changed, but all successive fixedloc slots need to be incremented by the size of the insertion.

Item Sets

The item store includes means for creating and manipulating collections of items called sets. A set is implemented as a list of item numbers. Each item number is an index to an array of pointers, each of which points to the memory location where the data contained in a particular item can be found. The set management functions exported by the item store via the Set Control API interface seen at 230 in FIG. 1 make extensive use of the "active set." When Activeset=0, the active set consists of all items in the library in itemnumber order. The assignment Activeset:=NewSetNumber ($FFFF) instantiates an new, empty itemset at the lowest available number and sets the Activset property to that number. Items can be added to the active set using the methods:

```
AddToSet(ino);      { result: original plus ino if not already there }
Import(SetNo);      { result: members of either original or source }
OrSets(SetList);    { result: all members in original or any list set }
AndSets(setList);   { result: only members of original and every other}
NotSets(setList);   { result: only members of original and no other }
```

Individual items can be removed from an itemset using the method:

Remove(psn); {where psn is the location in the set);

An itemset can be filtered by the method filter(filterfunction) where filterfunction=function(const a: integer): boolean;

The passed filterfunction returns true when the item specified by the Itemnumber a meets the desired criteria, otherwise the item will be removed from the itemset.

Exporting and Importing Sets. Sets are passed between itemset objects as pset pointers to tset arrays[0..locstop] of integer which hold plus or minus size values depending on whether they are in itemnumber or some other sorted order. The exporting itemset object always allocates space for the pset^ which is equal in size to abs(pset^[0])*4. The receiver should deallocate the pset^ space when it is no longer needed. Note that a pset^ is unknowable to any routine other than the procedure calling an itemset's export function. The Export functions include:

function export: pset;
function filterset(pset,filterfunction): pset;

Note: to obtain a filtered copy of the contents of an itemset xguy, call filterset(xguy.getset, filterfunction).

The ItemSet properties:
FormatStr[Fno]: string;
DataPtr[Fno]: pointer;

allow data to be written to and read from items in the itemstore without the need to manipulate itemnumbers. Each property mirrors the like itemstore property FormatStr and DataPtr using, as the missing item number Ino, the itemnumber specifed by the current cursor value.

The function GetSet: pset merely passes the pointer thisset owned by the itemset and is used to allow the functions Import, OrSets, AndSets, NotSets, filterset and sortset to create new sets by copying from referenced items. To permit the logical combination functions to work rapidly, thisset always points to an array in its original itemnumber order. The only time a pset^ exists in some other sorted order is when it is created by the function:

function sortset(pset,sortfunction): pset;

Thus to create a sorted set from a particular itemset named xguy, call:

sortset(xguy.getset,sortfunction);

To create a set which is both filtered and sorted, do the filtering first (to leave less to sort) as follows:

sortset(filterset(xguy.getset,filterfunction),sortfunction);

None of the filtering, sorting, or logical combination functions deallocate the input sets. They do allocate new space to the output sets they create, however, which must be deallocated in some fashion by the caller.

The Structure Of an Item

All data is stored in items in the item storage unit depicted at 120 in FIG. 1. Each item is stored at a memory location which may be found in the array ip in the data map 130 which is indexed by itemnumber. Thus, the item and its data can be addressed at ip^[itemnumber].

Every item stores a value indicating its length and a further value indicating its itemtype. The itemtype may be fetched from the item and used to determine the offset location within the item of the data for any defined field in the item, as well as the size of the data used in that field. Because the database system contemplated by the invention is specially adapted to store and manage variable length text data, a mechanism is provided for rapidly determining the memory address of both fixed length and variable length fields. To accomplish this, the fixed length items are placed first in the item, followed by fixed length offset values which specify the locations of the variable length data within the item. Both the fixed length field offsets and the location of the fixed length offset pointers to variable length data are given in a mapping data structure in the data map 130 that is devoted to each itemtype.

Figure 3:
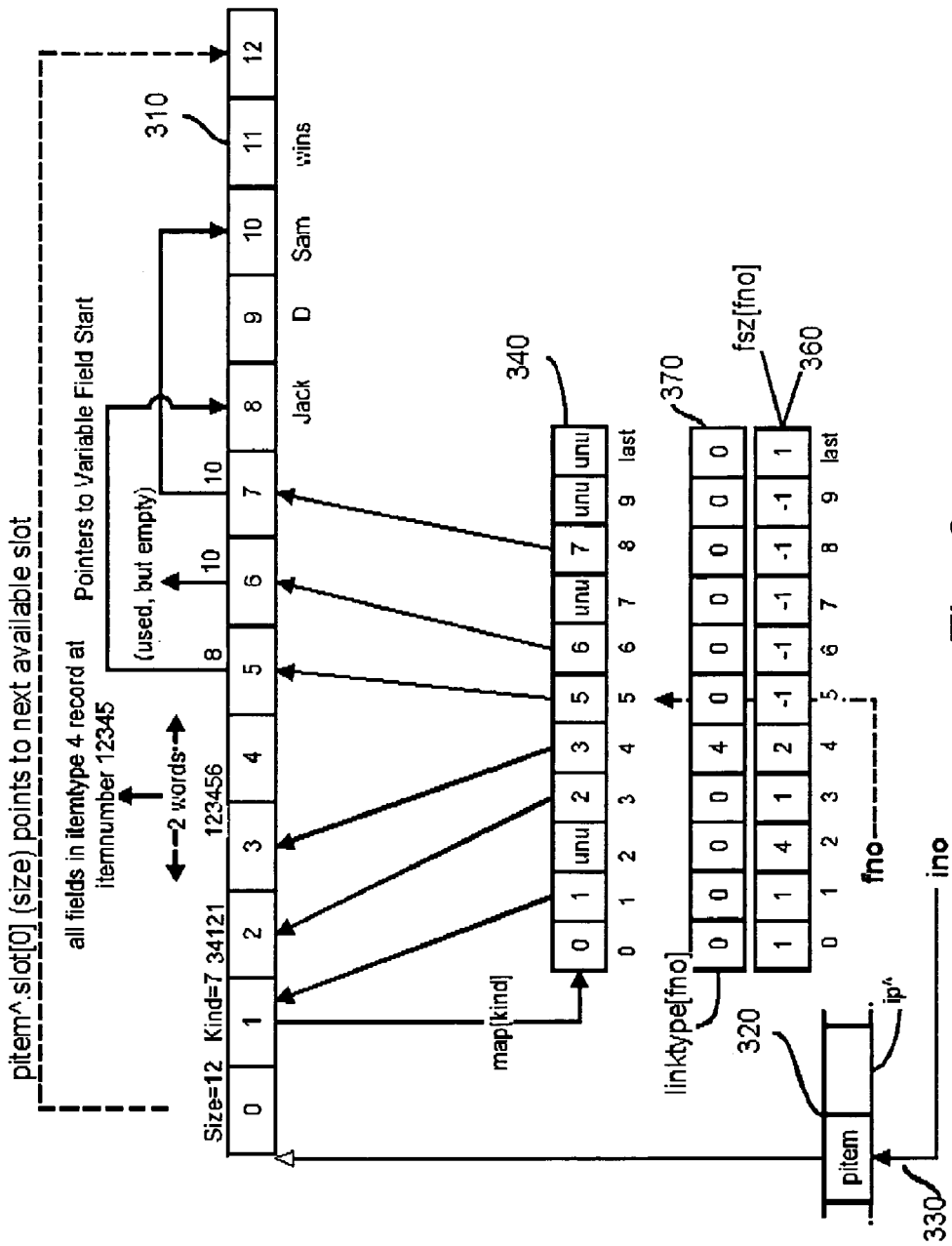
FIG. 3 is a data structure diagram illustrating the operation of the field mapping mechanism used in the DBMS.

The item layout and mapping mechanism is illustrated in FIG. 3 of the drawings. Each item is formed as an array of 16 bit binary values seen at 310 and is addressed by a pointer of type pitem found in the pointer array ip^ seen at 320 in FIG. 3. The pointer array ip^ is initially built by placing pointers to each item where it resides in the loaded integer storage block idata^. Thereafter, each newly created pitem^ is allocated on the heap for every item (record). Individual items are those always located in the itemstore at ip^[ino] where ino is the item number and ip^[ino] holds a pitem to the titem.

The first slot pitem^[0] in an item array 310 always holds the size of the item in words (i.e. 16 bit array slots). Very large items are handled by a special itemtype which uses a 32 bit size integer. The second slot pitem^[1] always holds the itemtypenumber of the pitem. The itemtypenumber is used to index one of the dimensions of a data map table (seen generally at 130 in FIG. 1), the other being the fieldnumber (fno). The data map table (named Map) can thus be addressed using the itemnumber and the field number ( Map[ip^[ino]^[1],fno]) to obtain the offset location within an item of a numbered field. If the field has a fixed length, its actual value is located at the offset specified by the map.

In the example shown in FIG. 3, the item number ino at 330 is used as an index to the ip^ table 320 to obtain the memory address where the item array 310 is located. The itemtypenumber value in the second slot (itemtypenumber (pitem(ip^[ino]^[1]) )) the selects a mapping layout structure called fixedloc seen at 340 respectively. In addition, two mapping structures called fsz (fieldsize) at 360 and linktype at 370 are used to indicate the characterists of individual fields. All of the mapping structures 340, 360 and 370 are indexed by field number.

The structure map[kind].fixedloc seen at 340 contains the offset location within an item of itemtype "kind" of each numbered field. If a given numbered field in not used in the specified itemtype, the constant value "unused"(65535) is placed at fixedloc[fno]. If the particular field number contains variable sized data, the item location specified by fixedloc[fno] holds an offset value where the variable length data begins.

The structure fsz holds the size, in 16 bit words, of fixed length data for each field type. Thus, in the example of FIG. 3, field number 2 has been assigned a fixed length datatype which occupies 4 16 bit word slots; however, as shown by fixedloc[2]=unused, field number 2 is not used by the example itemtype, so no space is assigned to it in the map.

When a variable length data type has been assigned to a particular field number, the value -1 is placed in fixedloc[fno], indicating that the offset location where the variable length data begins is to be found in the item data at slot map[kind].fixedloc[fno]. Thus, in the example of FIG. 3, field number 5 has been assigned a variable length data type as indicated by the -1 value in at fsz[5]. The value at map[kind].fixedloc[5] is 5, indicating that the variable length data for field number 5 begins the offset value 8 contained at pitem^[5]. Note that the length of this variable length data field can be determined by subtracting the start offset at pitem^[5] from the start of the next variable length segment at pitem^[6]=10. In this case, because the next variable length field is assigned but empty, the start value 10 of the next actually used variable length data extent appears at the offset locations at both pitem^[7] and pitem^[8].

Fixed length fields are thus accessed by looking at map[].fixedloc[fno] which holds the location in the item where the data begins. Varible-length data is stored at a location which begins begins at pitem^[fixedloc[fno]] and has a size equal the difference between that location and the next. An empty allocated variable sized local field fn1 has a zero size as indicated when pitem^[fixedloc[fn1]=pitem^[fixedloc[fnx]] where fnx is the next used variable length field number after fn1. Note that fixedloc[lastfield] holds a dummy variable length field whose offset slot specification is set to point to the first variable length data position to enable the size last used variable length field to be determined in the normal way.

When a new variable length field is added, the variable data is inserted at the location formerly occupied by the next higher fixedloc field whose offset is given by the current slot value; in other words, that slot value need not be changed, but all successive fixedloc slots need to be incremented by the size of the insertion.

Linked Items

FIG. 3 further illustrates the manner in which linking fields are specified and managed. A linking field is assigned a field number like any other field, but does not contain data. Instead, two slots are reserved at a pitem^ fixed field position to hold a 32 bit item number of a linked item. As seen in the example of FIG. 3, field number 4 has been assigned to a linking field having a size of 2 slots as seen at fsz[4]in 360. The itemtype of the item linked to may be optionally placed in the linktype structure at linktype[fno] as illustrated by the linktype value 4 placed at linktype[4] in the structure 370 seen in FIG. 3.

Linked data is always accessed though an item number link which is located within the item at the location specified in map^.fixedloc[fno] which specifies the location a two-word long field holding a 32 bit item number. As described later, a linking field may be generic, indicated by a constant value in the linktype[fno] location If the field is not a linking field, the value in linktype[fno] is set to zero.

The linking field mechanism permits virtual fields to be added to an item to refer to data which actually resides in a separate linked item. For example,an itemtype "Timeslip" can be defined as being composed of the following fields:

| Field# | Name | Datatype | Located in |
|---|---|---|---|
| 4 | Clientname | ftext | Matteritem |
| 5 | Clientcode | finteger | Matteritem |
| 13 | Mattercode | finteger | Matteritem |
| 17 | Mattertype | finteger | Matteritem |
| 21 | Attyname | ftext | Attyitem |
| 22 | attycode | finteger | Attyitem |
| 24 | attyrate | fsingle | Attyitem |
| 30 | performed | fdate | (this item) |
| 31 | hours | fsingle | (this item) |
| 32 | services | ftext | (this item) |

Because each timeslip record should be associated with a specific matter which is in turn associated with a specific client, the fields 4,5,13 and 17 from a referenced matteritem are to be included in this itemtype while fields 21, 22 and 23 should be included from a referenced Attyitem item. Only the field numbered 30, 31 and 32 actually contain data within a timeslip item since the data for the other fields is stored in the other items. Thus the timeslip item can consist of the three local fields 30,31 and 32 and two linking fields, one of which refers to items of type matteritem and the second of which links to items of type attyitem.

The description of the matteritem from which fields 4,5,13 and 17 are used might look like this:

| Field# | Name | Datatype | Linked to |
|---|---|---|---|
| 4 | Clientname | ftext | Clientitem |
| 5 | Clientcode | finteger | Clientitem |
| 6 | ClientAddr | ftext | Clientitem |
| 13 | Mattercode | finteger | Matteritem |
| 17 | Mattertype | finteger | Matteritem |
| 21 | Attyname | ftext | Attyitem |
| 22 | Attycode | finteger | Attyitem |

Notice that Clientname, Clientcode and ClientAddr fields to be used in the Timeslip item are not actually in matteritem but are included in it using a link to the a clientiterm. Thus, the timeslip item makes this information available by first dereferencing the linking field to get the matteritem, and then dereferencing a linking field in the matteritem to get to the Clientname and Clientcode data from a clientitem.

Notice also that the data for the Attyname field 21 in the timeslip item is contained in an attyitem which is found via the linking field in timeslip to an attyitem. While the matteritem referenced in the other linking field also contains an Attyname field 21, that could well be a different attorney (the billing attorney responsible for that matter as opposed to the attorney who performed the services recorded in the timeslip item.)

Thus, when the user elects to include a defined field in an itemtype, that field can be unique to that item or can come from a referenced item, or come from an item linked through other items by several levels of indirection. Thus, in the example, the timeslip actually contains two link pointers, one to a referenced matteritem and another to a referenced attyitem, and three fields (30, 31 and 32) which belong to this timeslip. In a conventional relational database, the same relationship would be created by a timeslip record containing key values identifying unique records in referenced matter and attorney tables. Note also that all items which attach a particular field from a given item can be found by scanning all items for link pointers equal to the itemnumber of the given item. Said another way, a "one to many" relationship can be established by defining a filter for a set in which the filter criteria is satisfied by items containing a link to an identified field in which the link has the given itemnumber value.

A one to many relationship can be established by storing, in a given item, an array of itemnumbers of several items. Thus, a clientitem might contain an array of pointers to matteritems for that client, permitting a table to be displayed in which the rows contain fields from the associated matter items. In most cases, however, it will be more space efficient and adequately fast to dynamically create the set of matteritem numbers which contain links to the given client item without actually saving the itemnumbers in the client item. The dynamic set creation approach also eliminates the need to update the client item each time a new matter item is created.

Referential integrity can be enforced in both directions by the user. If an item which contains links (itemnumbers) of other items is about to be erased or have a referenced item changed, a warning can be issued. Similarly, if an item which is referred to is to be erased, a search can be conducted to locate references to the threatened item and a warning issued. To facilitate the enforcement of referential integrity, status bit fields may be added to the itemtype definitions which indicate the presence of link fields and entire items whose referential integrity should be protected, either by prohibiting deletion when the item refers to or is referred to by another item, or by generating a warning. These status bits can interrogated by the itemstore's deleteitem method and a search conducted automatically for items which may refer to this item before deletion is permitted. In addition, links in a field which is about to be deleted can be tested if desired to prohibit or warn against deleting items which refer to other items.

The map[ino,fno].linktype structure seen at 370 in FIG. 3 specifies the itemtype of the linked item by number. Thus, in the example of FIG. 3, it is seen that only field number 4 is a linking field and that it contains a link to itemtype 4. Note also that a linking field may be generic (as specified by a predetermined constant flag value in linktype[fno]. A generic linking field can contain a link to any item type whose item type is determined by data carried in the item itself. Generic links make it possible to create arbitrary tree structures where items of arbitrary content may have parent-child relationships with one another. Thus, while the typing of items is advantageous in many applications, typing can be eliminated to permit the creation of free form structures.

While the linktype structure described above can contain type information about each link in the fixedloc map array, the presence of link type designations does not preclude performing polymorphic operations on any link. Polymorphic operations are made possible by the fact that numbered fields are identifiable in and can be shared by items of many different types. By way of example, a predetermined field number can be assigned to an itemdate field which holds data of type date. Any item, regardless of its type, might be assigned an itemdate field, and the location of the data in that item can be readily found using the data mapping capabilities described above. This means that a variety of polymorphic operations envolving the item dates can be performed. For example, all items dated in a given year, regardless of their type, could be placed in a single set. In the same way, a test can be performed to see if any linked item, regardless of type, which is linked by a linking field, satisfies a date constraint.

Although polymorphic link field handling may be useful, the user of the system will normally find it helpful to display the itemtype layout of linked items. The user needs to select the fields that are desired from the list of fieldnames, and needs to see the extent to which those fields have been used in other itemtypes. Thus, in the example above, the user created the timeslip itemtype by first including desired fields from existing itemtypes that will contain attachable data at runtime in linked items. When the user selected the "clientname" field, for example, it is useful to be able to visually see that this field is used locally in the clientitem and that other itemtypes link to that data directly, while still others link to it by indirection through other still other items.

Accordingly, a code indicating the itemtype of the item to which each linked field is linked is placed in the linktype [fno] array for that itemtype. This makes it possible for the system to display items of the specified itemtype to the user for possible selection and use, and further makes it possible to test any item selected by the user for conformance with the item type designation previously supplied by the database designer.

Figure 4:
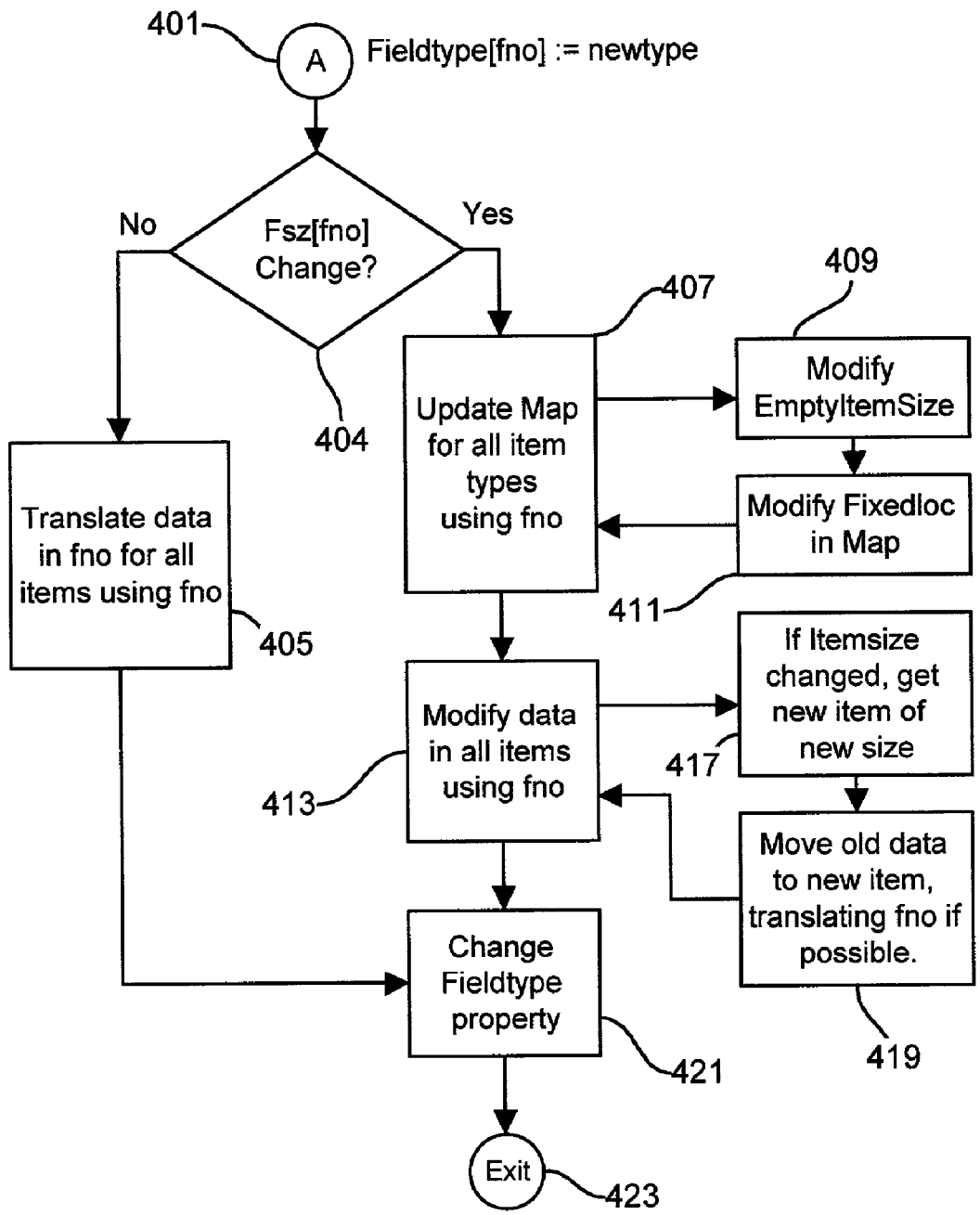
FIG. 4 is a flow chart which illustrates the method used to modify the typed data definitions used to automatically address an manipulate fielded data in the DBMS.

The datatype associated with a field may be changed even though the field has already been used to store data. As shown by the flow chart seen in FIG. 4, when a new data type is assigned to the property field type, the routine beginning at entry point A seen at 401 is performed.

A test is made at 404 to determine if the size of the designated field is different from the previously assigned size for that field. If not, an attempt is made to translate any existing data in that field in any item using that field as indictated at 405.

If the size has changed, the data map is updated for all item types using that field as seen at 407 by modifying emptyitemsize at 409 and modifying the fixedloc array at 411. Next, at 413, all of the data which uses the field is modified by allocating a new item of the new size at 417 and moving the old data to the new item, translating the data in the changed field if possible, as indicated at 419.

Finally, the field type value as reported by the fieldtype property is changed to the new value as seen at 421 before the routine exits at 423.

User Interface

The item store engine that has been described may be used by a variety of client applications to provide commonly needed data storage and retrieval functions. The item store can also be made directly accessible to the users who are given the ability to define and use databases of their own choosing.

In such a system, the layout dialog seen at 107 should present to the user an understand-able view of the relationships the user must define before using the program. These relationships are stored as field and item type definitions used by the data addressing mechanism described. Several metaphors can be used singly or in combination to simplify the user's task:

(1) a notebook where the tabs divide the steps of a data structure setup procedure;

(2) an outline metaphor which encourages the creation of a record type hierarchy which can be used to establish ancestor—descendant relationships between record types with the ancestor types including fields common to more detailed subsidiary descendant records to which specialized fields are added;

(3) a list-based metaphor in which fields are moved into a record from a list of available fields or copied by cloning from a list of previously defined record types.

Defining Linking Fields

It is also desirable to present to the user an easily understood representation of the linked item type capabilities provided by the linked-item map mechanism.

Recall that the linked map mechanism allows linked fields to be assigned to a typed items and the linked fields contain data that resides in one or more different items. For example, an invoice record might link in fields which describe a customer (e.g. customer name, city, state, etc.) where the data actually resides in a linked customer item. This works by allocating space in the invoice item for an itemnumber field which holds the item number of the particular customer item for this invoice. During data entry, the user selects the proper customer item from a list of items of the customer record type, causing the item number for that record to be entered into the link fields. Then, whenever the invoice record is viewed, the related customer record fields can be viewed at the same time. Moreover, when the customer record is viewed, a table of invoice records can be displayed in which the rows are invoice records holding the itemnumber of the particular customer record in their link fields.

At form design time, special controls can be used to create the desired linking between items and to display linked items in a common display. A drop down combo box, for example, can be used to display a list of records of a given record type from which a record can be selected whose itemnumber is then placed in the link field of the base record being entered. A table which displays all records of a given record type having link field containing the itemnumber of a base record can be used to create one-to-many detail listings. The combo box used to select a parent record need only be assigned a fieldname and an itemtypename. Similarly, the table need only be assigned a selector fieldname, an itemtypename, and a set of assigned fields (for the table columns). This does not, however, resolve the problem of how to best obtain from the user the information needed to map the link fields.

Defining Fields and Items

There is a preferred sequence in which the user should provide the field and item type information. A item type definition consists of elements which must be themselves first defined. Fields must be defined before they can be added to a item. When a itemtype should share fields with other item types to permit them to be polymorphically processed, such as sorting items of different types by a shared field, the shared fields should first be placed in a (perhaps abstract) ancestor item type from which the more detailed descendant item types may be cloned.

If a item type should share data in a one-to-many relationship, the shared data fields should be placed in a separate item type which may then be linked into the detail itemtype when it is defined. (Note also that a user may allocate space for an untyped link that can hold any itemnumber.) The distinction between ancestor-descendant shared fields and fields shared by actually linking data can be expected to be confusing. In both, fields which exist in a different item type "appear" in the item type being defined. In some ways, the end result may be the same. For example, an invoice item type may be cloned from a customer item type so that the customer describing fields are found in the invoice item type, or those same fields may become part of the invoice item by linking the invoice item to a customer item. The leading difference between the two is that data in inherited fields is not shared with other items, whereas data in linked fields may be.

The choice of whether sharable fields should be inherited or linked needs to be considered at different times. Both inherited and linked fields are placed in item types which are defined separately and before the detail item types which will later be defined to include these fields (by inheritance or by linking). Thus, while the decision of the manner in which such fields are included may be deferred, the user needs to plan ahead, and the inheritable and/or linkable itemtypes need to be created with a view to their future role. Both should include only fields which will be shared and should avoid fields which will make sense in only some, but not all, of the detail item types that will later incorporate these itemtypes by linking or inheritance.

Extra linked fields do not take up space in the detail item, they merely become addressable though the link that is there for other purposes. Moreover, item types which contain inherited fields tat are unneeded can be tailored by selectively removing those fields, with the only penalty being a departure from the field content suggested by the detail item type's apparent place in an inheritance hierarchy which may be conveniently used for planning.

The user needs to understand that linked data is shared while data in inherited fields is not. Changing the content of a linked field changes the content of that field in every item that links to it. That is desirable when all shared fields necessarily mean the the same thing. For example, if a customer changes its mailing address, then that mailing address should be changed in every detail item containing fields which describe that customer. If, on the other hand, it is desired to include a date field on many different kinds of items so that they can be polymorphically sorted chronologically, the date field should be shared by inheritance, not by linking, since every detail item may have a different date.

Note that a linked field may be inherited; that is, it may often be useful to create an abstract descendant item type that contains links to one or more predefined item types as well as newly defined fields which may be shared by inheritance. For example, a "customer document" item type may be defined which links to all of the fields in a customer item type and which adds the fields "document date" and "accession number". Thereafter, detail item types "invoice", "order", "offer" etc. may descend from the "customer document" item type so that all such items can be sorted for presentation to the user in chronological or accession number order. When this is done, the customer identification fields, as found in a given invoice item type for example, are both inherited (from the "customer document") item type and linked (to a given customer item).

It is accordingly more appropriate to described fields as being "linked" or "imbedded" and separately as being "inherited" or "newly declared". Thus, it can be seen that the process of defining item types should normally proceed by the following sequential steps:
1) Define item types containing linked (shared) data which will be referred to in items of other types such that alterations to that data will be reflected in all of the items making the reference.
(2) Define generic item types which contain fields (including linked fields from other items) which represent common attributes of a plurality of detail item types which will inherit those common fields from the generic item type. To the extent generic item types include linked fields or themselves subclass even more generic items, the item types which define such linked or inherited fields will already be defined.
(3) Define detail items which further include specific fields which relate only to the thing being defined by the detail item.

Inheritance

Changing the item type structure of a linked item makes corresponding changes in the item type structure of every item type that links to it, whereas when a item type inherits fields from a generic item, later changes to the generic item are not necessarily reflected in the child items (or at least wont be without a specific process being added to the layout mechanism to ask the user if those alterations should be reflected in the descendants). A user may view the inheritance structure as simply permitting previously defined item types to be used as templates which form a convenient starting point for defining more detailed items. Under this view, inherited fields may be removed from a detailed item if they are unneeded, and hence the user need not take special care to observe a strict hierarchical structure.

A strict inheritance system would make it mandatory that all fields in a generic structure also be included in every descendant structure to insure that all fields in a generic structure are available for polymorphic operations on the descendant item types. Loose inheritance appears preferable. Unlike the most widely used OOP addressing mechanisms used for addressing inherited methods, the present system provides an addressing mechanism which allows any field (declared by fieldname and fieldtype) to be placed in any declared item type and to be addressed and polymorphically processed whereever it is found. The ability to "clone" from pre-existing item types, taken with the presentation of a item-type outline which shows the loose relationship between the clones their sources, seems to provide adequate encouragement to the user to create polymorphic relationships.

The heirarchical item-type outline also provides information needed to present the user with the choice of whether to incorporate changes in a generic ancestor structure into cloned child structures. The continued inclusion of all fields in a generic structure in all cloned child structures need not be enforced, however, since that restriction seems to offer no compelling advantages to compensate for its rigidity. For all of these reasons, a preferred form of field and object layout definition dialog box would present item types in collapsible outline format.

Field Definitions

As noted above, fields are declared by fieldname and by datatype and, once declared, may be used in any item type. The naming of fields also encourages polymorphic field assignments. Thus, as described above, a date field named "Date Created" may be used in any itemtype that can benefit from such a field, without regard to the possible positioning of those items in an ancestor-descendant cloning hierachy. To encourage this kind of library wide polymorphism, the fields should be placed in a listing organized by datatype, and the user should be presented with the pre-existing list to encourage use of existing fields rather than creating new ones. This not only encourages users to create fields which may be used in polymorphic processing, it saves memory space.

As previously described, the data map is a table like structure addressed by item type and field number. Thus, space in the table for each field specified for one or more item types must be allocated for each new field. When fields are reused in different item types, no additional mapping space is needed. There is one restriction against including fields in item types. A field can't be used twice in one item. This means that it is not possible to include two different "date created" fields in one item. If, for some reason, it is necessary to create more than one field of the same datatype which might be described by the same name, different names should be used, such as "Original Date Created" and "Revision Date Created"

To define a the data structure for a database, the user (or programmer) should:
(1) Define fields by name and type.
(2) Define itemtypes by first designating the fields to be included locally in the following steps:
STEP 2A Select ancestor itemtypes from which more detailed descendant item types are derived in order to promote the use of shared, polymorphic fields and include those ancestor fields as local fields
STEP 2B Select additional fields from fieldlist to be included locally (after adding new fields to the list as necessary)
STEP 2C. Chose an itemtype which includes fields to be made virtual fields in this itemtype (meaning this itemtype will include an itemnumber specifying a linked item). When the user wants enter data into a virtual field, it is necessary to first select the linked item to hold that data. The client application program will typically automate the selection of linked items in one of a number of possible ways, such as accepting data for virtual fields using listboxes or drop-down combo-boxes which display all possible values for a key field in items of the link-designated itemtype. Selecting data in a key field of the listed items restricts the displayable values in the other virtual fields from the same item to those in items matching the selection. When a single unique item is found, all other fields are filled.
Alternatively, "selector" fields used to identify a item being linked to could be specified in priority order—and lower priority select fields would display instruction to fill in highest priority but still incompleted field until a match is found. Any attempt to alter a selector item would be accompanied by a warning. For any attempt to alter a linked virtual field from a referencing itemtype could be met with variety of responses: (a) virtual fields could be read-only; (b) virtual fields could be alterable only via a form which displays the entire linked itemtype; (c) virtual fields could be alterable only after a warning is issued which specifies the number of other items referencing that item; or virtual fields could be altered freely without warning. A pop-up form which displays all fields of the referenced item, and identifies the referencing items may displayed to assist the user (c) specify existing itemtypes which are to be displayed as a table, and the key value field present, or linked into, the form which operates as the selector for the row items in the table.

STEP 3. Once the user interface for specifying fields and itemtypes has been designed, the application program also provide the user with edit controls as indicated generally at 109 in FIG. 3. Because the item store include means for accepting and delivering date in character text form, conventional edit boxes, table string grids, list boxes, and the like can be readily used to interface with item store.

In addition, once the item types and the field types they use have been defined as noted above, the application program may automatically generate forms which contain edit controls suitable for displaying, entering and modiflying the data in any item as well as the data in any virtual fields in linked items, and further displaying tabular listings of one-to-many relationships created by linking fields. Table creation can often be automated given the specification of one an itemtype and one or more fields (local or virtual) which operate as the table row selectors. The user then needs to specify the columns to be displayed from the list of fields (local and virtual) in the specified row-defining itemtype. When the user adjusts the column width on the resulting table, those column settings should be saved and govern successive uses of the form Initial column widths for the form may be estimated from the datatype information.

As an alternative to the foregoing, a tabbed notebook of steps might be used to define an "autoform" which is created by the application program from the field and itemtype definitions stored in the item store;

Step 1. Define Fields. Specify all fields used by name and datatype. Come back to this step whenever more fields are needed. Fields need to by polymorphic in order to permit searching, etc. on single fields.

Step 2. Define Itemtypes

A. Specify all local fields in itemtypes.

B. Specify existing itemtypes whose fields are to be included as virtual fields in the itemtype, and select key fields in that itemtype to be used as the item selector.

C. Specify existing itemtypes which are to be used as table rows, and specify selector fields whose values will define the table entries (with selector field often holding the itemnumber of the local item being displayed), so that when the specified table itemtype contains a link to the local itemtype, that will be used.

Step 3. Design the Form for the Itemtype

A. Select the fields to be shown by selecting from all of the available fields (local, virtual and table);

B. Arrange fields in the desired tab order, which is typically (but not necessarily) the order in which it is most convenient or logical for the user to supply the data needed to complete an item or an item and the virtual fields from other items.

C. Specify field relative field sizing and placement on a line to support variable sized window displays.

D. Add decorations, prompt labels, etc.

Note that, because it is often desirable to view the contents of sets which contain related items of differing item types, each with its own display form, the form display should be data responsive. As the cursor is moved through a set, the item type of each item to be displayed is obtained from the item and used to select a display form appropriate to that item. If no form has been designed for that itemtype, the system should display a working autoform which contains a control for each field datatype in the defined itemtype, as well as a control for all virtual fields contained in linked itemtypes.

Serching and Filtering

Searching, either in the masterset to create a new set, or in an existing set to create a new subset, is accomplished by means of a user supplied filterfunction of the form:

filterfunction: function(const ino: integer): boolean which returns true if the item designated by ino meets whatever criteria the user might establish in the supplied function. Two methods in itemstore which use a supplied filterfunction are:

procedure filter(const ff: filterfunction);

procedure AppendFilteredFromMaster(const ff: filterfunction); the first of which filters the contents of the current active set thus normally reducing its content, and the second adds desired items from the master to the current set. Filterfunctions are normally implemented in the application program and are identified as callback functions to the item store engine.

Set Manipulation

After one or more sets have been produced by filtering, they may be combined by the logical operation methods available in the item store and exposed via the Set Control API interface seen at 230 in FIG. 1. These methods are:

```
OrSets(SetList);   { result: all members in original or any list set }
AndSets(setList);  { result: only members of original and every other}
NotSets(setList);  { result: only members of original and no other }
```

The OrSet operation can be used to form a new active set composed of all of the members of sets 1, 2 and 3 (eliminating duplicates). The AndSet method is then used to form a new active set which consists of those members of the current active set which are also members of both set 4 and set 5. Next the NotSet operation is used to form a new active set which is contains all members of the current active set which are not also members of set 6. The resulting active set is then filtered by calling a filterfunction which returns true for any item in the set which satisfies either condition 1 or condition 2.

The filtering, combining and sorting capabilities which can be used to manipulate sets of items provides a powerful information retrieval technique. To perform "data mining" of a database of widely differing item types, one or more polymorphic searches can be performed in the master file to locate items of potential interest. Items known not to be of interest can be specified by filtering functions and excluded from the list. Items known to be of interest but for differing reasons manifested by different filter criteria can be logically combined. Finally, all of the items may be sorted based on the presence of shared data fields to place the results in the most useful order for the user.

These set manipulation functions are particularly useful in combination with the high speed text searching capabilities which result from having all of the data in memory and having all of the text data represented as arrays of integers which can be searched by integer indexed matching routines as note above.

Sets may be permanently stored in items or in selected fields within items since they take the form of a sequence of 32 bit integers. Alternatively, a set may be "saved" by storing the identification of a filter function and the search parameters it uses to create a set from the masterset or another stored set. Complex search routines may be saved as a collection of searches which produce interim results which are then searched by other saved filterfunctions. In this way, a set may be dynamically created when needed to take into account the current state of the masterset, whereas sets saved as an itemnumber collection cannot reflect additions and modifications to the data made after the initial search was run.

Note that, because items can contain saved sets or set definitions, links to saved sets or set definitions can be used to establish one-to-many relationships. By way of example, a filter function and its parameters may specify a search which extracts from the masterset all items of a particular itemtype for which the "product number" field contents matches the "product number" field content of the item containing the link to the set definition. When the linking item is accessed, the link to the set definition can be access to initiate the search defined by the set definition specified in the link, resulting in the dynamic creation of a set of all items of a particular type devoted to the designated product number. In this way, a table of items showing the members of the set can be displayed with the content of the linking parent item.

Training and Storing XML Documents

Well formed XML documents which conform to the W3C XML recommendation (the most recent version of which is entitled *Extensible Markup Language (XML) 1.0 (Second Edition)* dated Oct. 6, 2000) may be translated into the combination of a sequence of integer values for storage in the integer store 120 and entries in the three termstore objects seen at 122 in FIG. 1.

To perform this conversion, an XML document is first parsed in accordance with the XML grammar as defined by 89 separate production rules which are expressed in the XML recommendation using a simple Extended Backus-Naur Form (EBNF) notation. Each rule in the grammar defines one symbol, and the rules build on one another. For example, a "document" is defined by Rule No. 1 as follows:

document ::=prolog element Misc*

Which means that a document must begin with characters which satisfy the definition of a "prolog" and be followed by characters which satisfy the definition of an "element" and conclude with zero or more instances of characters which satisfy the definition of a "Misc."

In the illustrative program listing found in the appendix, the file named builder.pas implements the parsing procedure using a set of include files which contain functions for parsing characters in accordance with the production rules. These include files are named rules01_20.pas, rules21_38.pas, rules39_40.pas, rules41_60.pas, rules61_80.pas and rules81plus.pas. In a an include file named combiners.pas contains utility routines for calling the rules routines in ways dictated by the EBNF rules.

Each of the production rules is implemented by a function which returns a boolean value true if encountered characters which satisfy the rule implemented, and returns the value false if the characters encountered did not satisfy the rule.

The characters which make up an XML document are placed in a character array (string variable) named x which is indexed by the value xi. Thus, the tenth character in an XML document * beginning at x[1] would be found at x[10]. At entry, each function tests the characters in x beginning at the current value of xi. If the characters beginning at x[xi] satisfy the production rule, the value true is returned and the index value xi is advanced to point to the next character after those characters that satisfied the rule. If the characters beginning at xi do not satisfy the rule, the boolean result false is returned, and the index value xi is restored to its value before the function was executed. Thus, any function that returns false has no effect on the location value xi and any function that returns true advances the index value so that another function can test the characters beginning after the last matching characters.

This parsing method allows routines to be written which are directly patterned after each rule. For example, the rule defining a document can be implemented by a function of the form below:

```
function document: boolean;
begin
    document:=prolog and element and star(misc);
end;
```

The function document first calls the function "prolog" which implements the rule defining the character content of a prolog.

If the function named prolog returns false, the characters in x are not a well formed document, and the function named document returns false (and the fact that the document is not well formed and cannot be parsed may be revealed to the user in an error message). If the function named prolog returns true, the global index value xi is advanced by the prolog function such that it points to the first character after the characters constituting the prolog, and the function named element is called. If element returns true, a combining function called star is called, passing it the identity of the Misc function as a parameter. The star function always returns true and calls Misc repeatedly until it returns false, thereby parsing as many Misc characters as may exist in the XML epilog.

Figure 5:
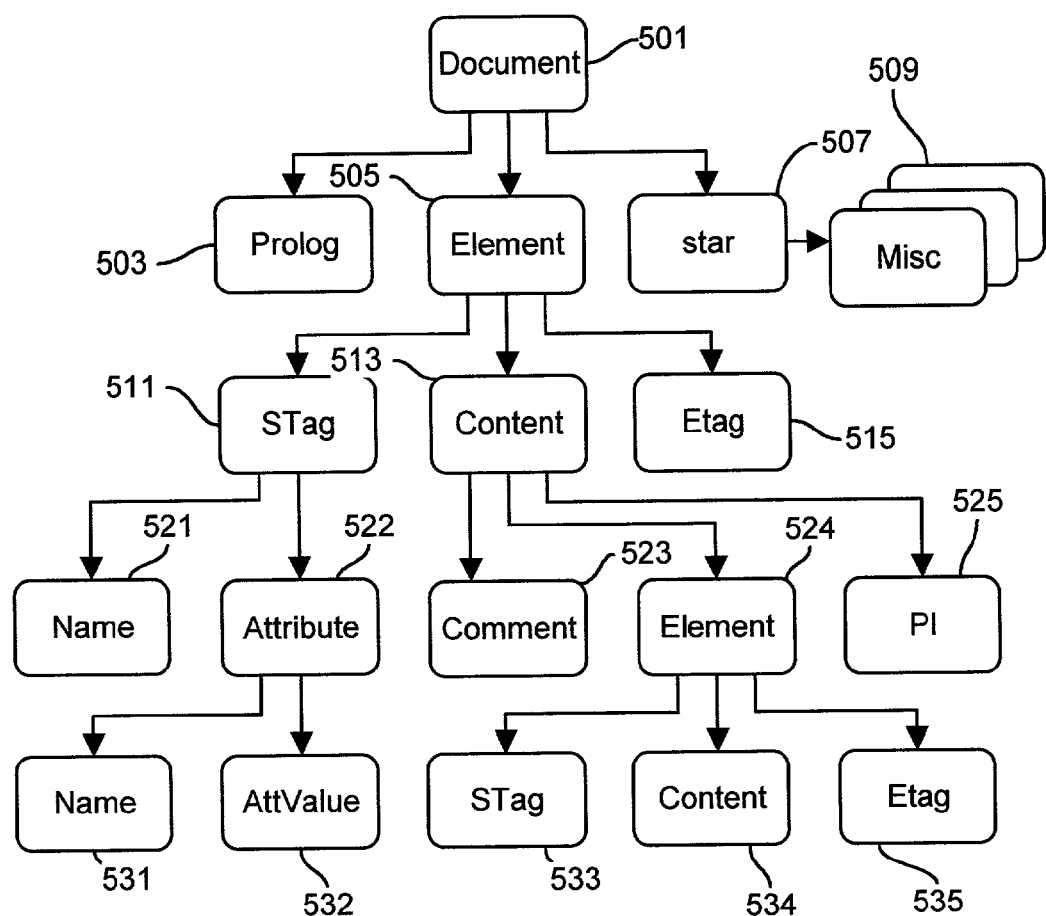
FIG. 5 is a diagram illustrating the re-entrant processes used to parse XML character data and to convert that data into a sequence of integer values in accordance with the invention.

The rules functions are reentrant. Thus, because an element is defined by the rules to include nested elements, the element function can call itself to parse the nested elements. FIG. 5 of the drawings illustrates an example of the reentrant calls that might by made as an XML document is parsed. As the XML document is parsed, the functions were called in the following sequence:

1. Document 501 called Prolog 503 and then Element 505
2. Element 505 called Stag 511
3. Stag 511 called Name 521 then Attribute 522
4. Attribute 522 called Name 531 then AttValue 532
5. After AttValue 532 and Attribute 522 and Stag 511 returned true in sequence, element 505 called Content 513.
6. Content 513 called comment 523 and Element 524.
7. Element 524 called Stag 533, then content 534, then Etag 535 (and these functions called other functions not shown in FIG. 5)
8. When element 524 returned true, content 513 called PI 525.
9. When content 513 returned true, Element 505 called Etag 515.
10. When element 505 returned true, Document 501 called the combiner function star 507 which repeatedly calls misc until it returns false as seen at 509.
11. Finally, document 501 returns true to indicate that the XML document is well formed.

Each rule function stores the value of xi upon entry so that it is capable of specifying the sequence of characters within the XML document which satisfied its constraints, and all of the constraints tested by the more specific rules functions it calls. This is done as illustrated by the following pseudocode:

```
function givenrule: boolean;
var lxi: integer;
begin
    lxi:=xi;
    givenrule:=(calledrule1 or calledrule2) and calledrule3;
    rulematch (givenruleno,lx)
end;
```

The value lxi is saved as a local variable in the function givenrule before that function calls its spawned functions calledrule1, calledrule2 and calledrule3. Note that the specific requirement specified by givenrule is that the characters which begin at x[xi] when givenrule is called must begin either with characters that satisfy calledrule1 or calledrule2, and must end with characters that satisfy calledrule3. If that expression is true, the value of xi points to the next character after the last character satisfying givenrule at the time the reporting procedure rulematch is called. The procedure rulematch is supplied with the rule number which identifies givenrule, and is further supplied with lxi, the position at which the characters satisfying givenrule begins. Rulematch can obtain the global variable xi upon entry, and thus can report both the rule number and identify the location of the matching characters.

As illustrated in the program listing for builder.pas, the object builder exposes methods which may be accessed by a client application program in the same fashion that conventional XML SAX parsers inform client applications of parsing events. The builder object declares the following public methods in its API:

```
procedure set_event_handler(const eh: tEvent_Handler); {call back}
procedure set_status_handler(const sh: tStatus_Handler);{call back}
function parse_document(const s: string; const resourceid: string;
    resourcedate: integer): boolean; { resource date is a filedate integer }
function get_event_count: integer;
function getlist: tlist;
procedure Ignore_rules(numberlist: array of integer);
procedure Use_rules(rulenumbers: array of integer);
function matching_chars(const startbyte,nextbyte: integer): string;
property integers_wanted: boolean read getwanted write setwanted;
```

To use the capabilities of the rules parser, a client program uses the method set_event_handler to identify a parsing event handler included in the client program, and further identifies a status message event handler for receding status and error messages (such as the failure to parse a document because it was found not to be well formed). The client program can then parse the XML document by passing it as a string to the parse_document method.

The rulematch function called when each rule is satisfied tests the received rule number and, if the results of that rule are wanted (as set by the client program using the methods Ignore_rules and Use_rules), to identity of the matching characters are posted to list of matching event node records, each of which stores the character position at which the matching characters begin, the character position of the first character after the matching characters, and a number called eventno which indicates the sequence in which the matching was detected at the conclusion of each matching operation when rulematch was called.

These event nodes are then sorted using the function ListSortCompare to place the event nodes in ascending order by starting character position and in descending order by the next first character position. This sort organizes the events into the order in which the matching characters occur in the document and, when more than one rule is satisfied by characters beginning in the same position, the events are listed in the order of decreasing scope; that is, a first rule which is satisfied in part by a nested call to a second rule is listed first, because it has the greatest scope. To handle the situation where two rules are satisfied by the same characters (which happens, for example, when a given rule is satisfied by one of a group of alternative specific rules), the events which are matched by the same beginning and ending characters are sorted in descending order by eventno-again placing the rule with the more general scope ahead of its nested rule.

The list of sorted events is made available to the client program by the exported function getlist: tlist which returns a tlist object. Thus, after the parse_document method successfully completes parsing, the client program can perform the following procedure:

```
var mylist: tlist; i: integer;
mylist:=builder.getlist;
for i:=0 the pred (mylist.count) do
if preptr(mylist[i]) ˆ.en then handleelement (preptr(mylist [i])ˆ);
```

The client program routine above steps through all of the events in mylist and passes the node record for each event describes a matching XML element to the procedure handleelement for processing by the client program.

Notice that, because nested functions may be satisfied, place event descriptions in the tlist, and then other portions of a calling function may fail to match. In this case, the event descriptions placed in the tlist must be disregarded. This is accomplished by saving the current event number (using the local variable lev:=eventno) at the start of each function where such a nested event may need to be overwritten. Before the calling event returns false, it restores the global variable eventno to its original value by calling the reset method reset_it.

Converting XML Character Strings to Intergers

The builder object converts the character strings parsed by the rules functions into an equivalent integer representation.

By calling the rules function document, the XML parsing mechanism described above first parses the XML into identified substrings that satisfy the XML grammar. While the sorted event list could be used to identify and encode these substrings, the coding can also be done by embedding routines for encoding matching characters directly into the rules functions. The basic approached used is illustrated by the following pseudocode:

```
var n: =array[0..ramtop] of word; {stores data in 16 bit words }
    ni: integer;       { index to next available slot in n }
function givenrule: boolean;
var lni,lxi,lev: integer;
begin
    lni:=reserve (2);
    lxi=xi;
    lev:=eventno;
    if rulesatisfied then
        begin
```

```
        setflagwc (givenruleflag, lni);
        rulematch (givenruleno, lxi;
            givenrule:=true
    end
else
    begin reset_it(lxi,lev); ni:=lni; givenrule:=false end;
end;
```

As before, the local variables lxi and lev are set at the beginning of the function to save the initial character scan position and event number. In addition, lni is set to the current integer output array value ni, which is then incremented by two to reserve space for the later insertion of item type and item size information. The character matching test is then performed as indicated by the psuedofunction rulesatisfied which returns true if the characters in the XML data satisfy given rule and which advances xi and also writes integer values to the array n, beginning at lni+2, in accordance with whatever integer writing code is present in the called rulesatisfied function. In the case of givenrule, the type and size of the sequence of integers written into n by rulessatisfied is recorded in a two word header an n[lni] and n[succ(lni)] for which space was reserved by the call reserve (2) when the function started.

As noted earlier, the output integer sequence is divided into subsequences. In the DBMS as described above, the integer subsequence was composed of a sequence of "items" each of which included header information which included item type and size information. Items, and the fields they contain, are addressable by item number and by field number, providing direct access to data. The beginning address of any item may be found via a lookup table given its itemnumber. Since the beginning of the item can be found, its item type designation and item size can be found by investigating the data at the beginning of the item. The header information is placed in the integer sequence by executing the procedure setflagwc(givenruleflag,lni) at the location reserved by the execution of the statement reserve (2). The value givenruleflag is a constant value which identifies the rule (and hence the nature of the matching XML text) which is convened into data value integers written by executing the function rulesatisfied. The value lni specifies the value of the write index to the integer array n, and taken with the value of ni when setflagwc is called, allows setflagwc to place a size indication in the header at the reserved location.

In the illustrative program listing found in the unit builder.pas, the type indicators written into the integer array are flag constants defined in an include file of constant value declarations named flagconstants.pas. As seen there, all of the flag constants have a value greater than the constant flagboundary—65,456. While most of the flags uniquely identify a selected rule which converts character data into integer data in the manner tailored to the needs of the portion of the XML document identified by that rule function, a group of different flag constants are used to handle special cases for the rule 39 which detects elements. In order to achieve maximum data a storage efficiency, short form data layouts are used for simple elements which occur frequently. See the function named "element" for rule 39 and its comments in the program listing file named "rules 39_40.pas." for details.

The unit builder.pas in the program listing appendix is designed as a standalone mechanism for translating XML into integer form. The resulting integer format, like the character format, can be described by an EBNF grammar. In the program listing comments to the rules functions, each character definition rule of the XML grammar is accompanied by an EBNF rule which states the grammar for the integer representation (in any) obeyed by the rule function as it writes the integer data into the output integer sequence The integer sequence can accordingly be parsed using rule function which obey the integer grammar, just as the character rule functions parsed the original XML document characters. As a consequence, parsing the integer data using integer parsing functions can be performed to recreate the original character document, with each integer parsing rule performing the inverse of the character-to-integer conversion preformed by the corresponding character parsing rule.

For some applications, it may be useful to simply recreate the stored XML document in its original character form for processing by conventional XML processing programs. In other applications, the integer parsing routine may provide event notifications to a SAX parser interface which behaves to client programs exactly like a conventional SAX parser interface, since it delivers desired character strings as requested by the client program. In this way, conventional XML utilization programs which use SAX interfaces may utilize any XML document in the integer store. In the same way, the integer store may be used to provide a DOM hierarchical interface.

Figure 6:
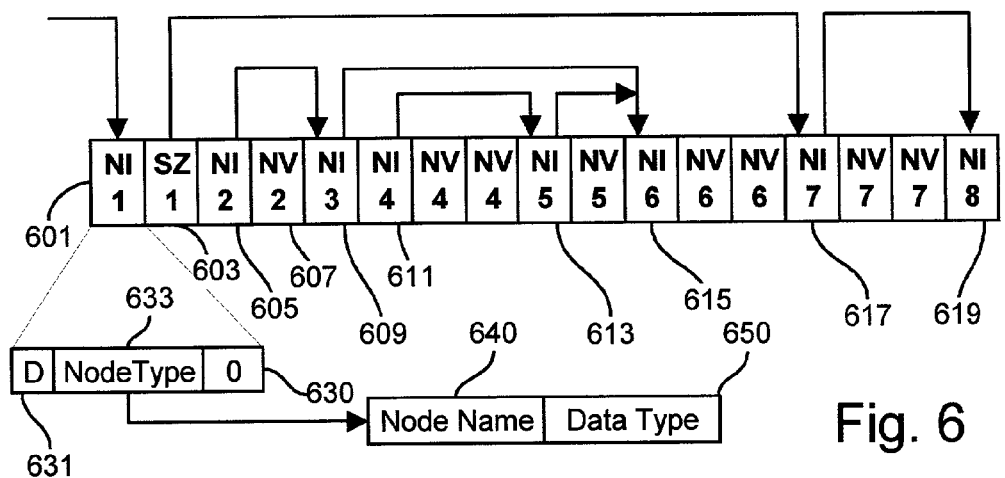
FIGS. 6 and 7 are a data structure diagrams illustrating the manner in which integers are used to form a hierarchical data structures.
Figure 7:
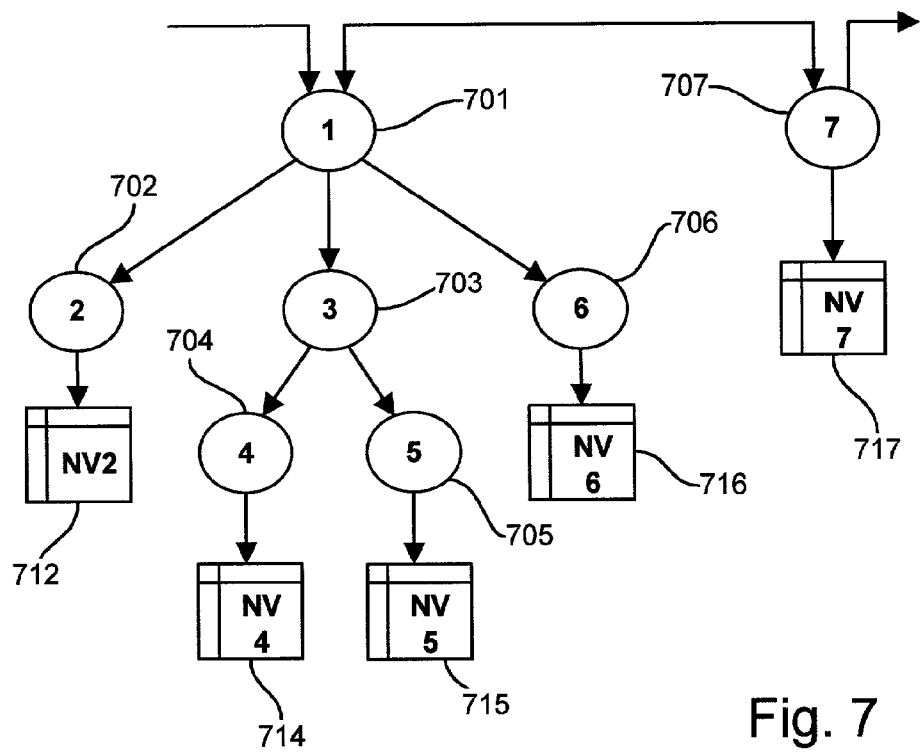

The manner in which a sequence of integer representations of XML characters may be used to represent hierarchical data is illustrated in FIG. 6 of the drawings. As seen there, a sequence of integers is stored in an array beginning at position 601 and ending at positions 619. These integers represent seven nodes of a hierarchical tree. Each node is represented by a node identifier, zero or more size integers, and zero or more value integers. The corresponding tree representation of the seven nodes is shown in FIG. 7. In each, the node is represented by a numbered circle and the data value for that node, if any, as a rectangle below the node circle.

Each node has header information stored in integer format in the sequence seen illustrated in FIG. 6. In the case of Node #1, the node information is located at integer location 601 which holds a node identifier NI1 and at 602 which hold a node size integer SZ1.

In general, the header information for each node identifies (a) the name of the node, (b) the data type of the node and (c) the size of the node. For fixed length data and for short variable length data, all three kinds of information can be placed in a single integer. For example, the high order bit (labeled "D" at 631) of the first integer location of a node, if not set to a "1", may indicate that the five low order bits (labeled "0" at 630) contain a node size value from 0–31, where 0 indicates that the size is actually placed in the next integer slot, as it was in the case of Node#1 where the second slot 602 holds a size integer. For very long nodes, the 5 low order bits may be set to 31 to indicate that the next two slots after the node identifier hold a 32 bit size value. Simple nodes having sizes from 2 to 30 may then avoid the need for a separate size integer, since the size can be stored in the low order bits of the node identifier integer.

In addition to the size indication, the node identifier integer NI1 contains 10 bits (labeled "NodeType" at 633) which point to an indexed information structure that contains information about the node, including its name at 640 and and the identification of its datatype at 650.

Thus the element names and attribute names found in XML documents, rather than occupying an entire integer space, may be identified by an integer value stored with other information in the node identifier slot. The high order bit "D" at 631, if set to a one, indicates that the 10 bits which normally contain an nodetype value instead contain the index location of a pointer to a separately allocated integer storage sequence. If the pointer specified is a null, the node has been deleted; otherwise, the pointer specifies a replacement node containing modified information. When the sequence of integers containing data is stored in memory, the replacement sequence is inserted in place of the older sequence. The original size information for a deleted or modified node is unchanged to allow a routine which is processing the nodes to locate the next unaltered node in the sequence, even though a given node has been deleted or modified. Note that, because nodes contains size information about themselves, there is no need to alter the size information in other nodes when the size information about a given node needs to be altered to reflect a modification to the data.

As seen in FIG. 6, the size value for Node#1 at 603, when added to the start position at 601, points to the next slot after Node#1, which is the beginning of Node#7 at 617. Note that Node#1 accordingly spans Node#2 through Node#6 which are nested within it as seen graphically by the hierarchical representation as seen in FIG. 7. In the same way, the size value of node 3 (which is found in the low order bits of NI3 at 609) indicates that it spans nodes 4 and 5 as seen also in FIG. 7. Note also that Node#1 contains no data of its own, but rather contains only other nodes.

XML elements and attributes can thus be readily mapped into the integer sequence. Element names and attribute names are stored separately and are identified by the nodetype values, which also specify datatypes. When XML schemas or DTD's are available, a single datatype designation for a node which is a complex type may specify a corresponding complex node type data structure which contains the names and datatypes for all of the nodes nested within that complex type. The existence of such type definitions accordingly allows the integer sequence to largely contain only data values. Complex repeating data patterns can be defined entirely in the node type information which is then used to map the meaning of the individual integer locations for processing.

Figure 8:
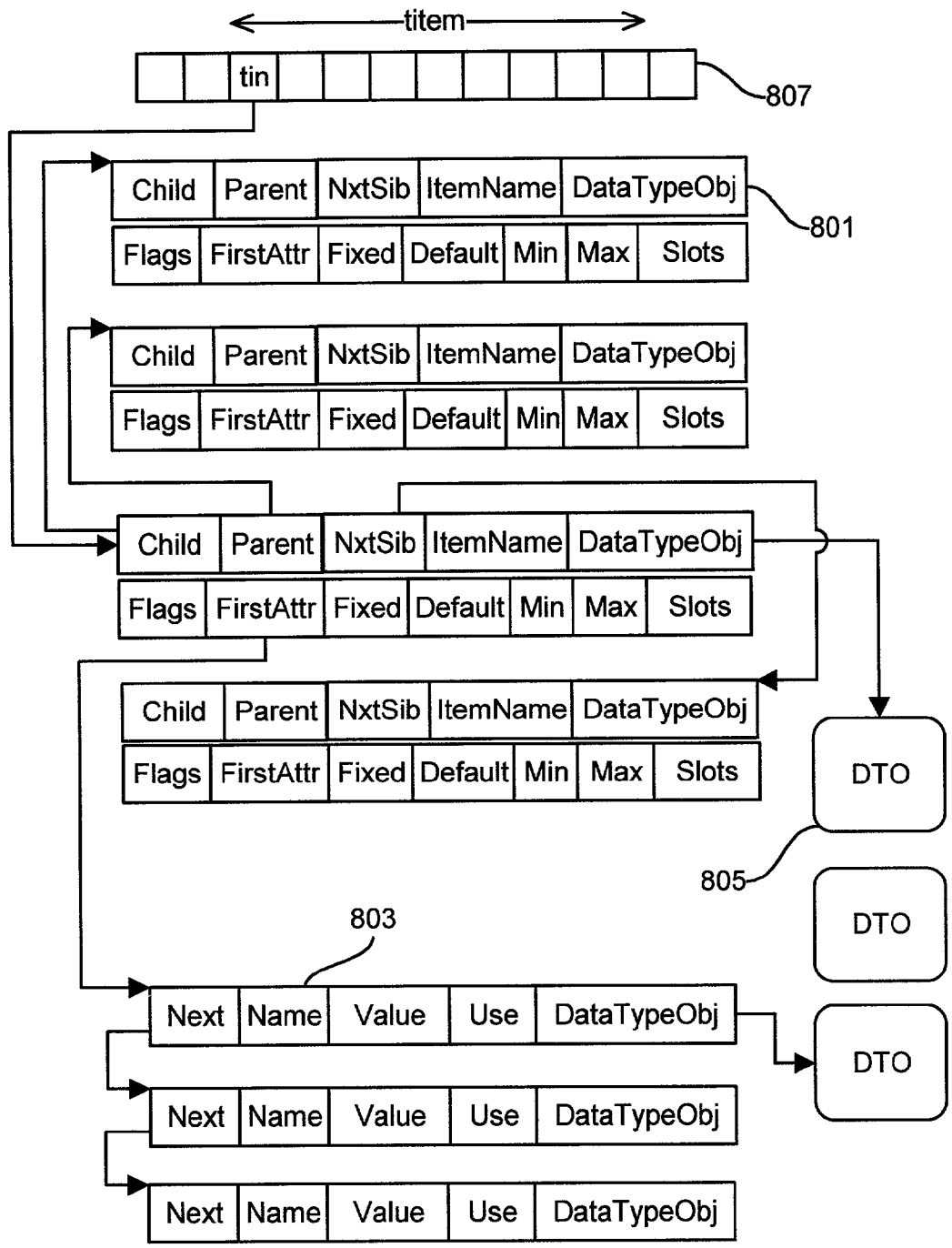
FIG. 8 is a data structure diagram illustrating how schemas may be interpreted to define integer data type structures.

For example, as illustrated in FIG. 8, a schema as defined by the XML Schema, Parts 0–2, W3C Candidate Recommendation, dated 24 Oct. 2000, may be interpreted (as seen at 129 in FIG. 1) to create the type definition structures seen in FIG. 8. Every defined element, whether it is a simple type or a complex type, is defined by a named data structure of the kind illustrated at 801. Expressed as a Pascal record definition, this structure contains the following information:

```
Element_Definition = record
    child: integer;         {first nested element, if any }
    parent: integer;        {parent of nested element, if any }
    nxtsib: integer;        {next sibling element, if any }
    ItemName: string;       {declared element name }
    DateTypObj: DTO;        {data value handler for element }
    Flags: integer;         {mixed, ... }
    FirstAttr: integer;     {first attribute_definition for element }
    Fixed: pointer;         {pointer to fixed value, if any }
    Default: pointer;       {pointer to default value, if any }
    Min,Max: integer;       {minoccurs, maxoccurs values, if any }
    Slots: pointer;         {relative location in titem }
end;
```

If an element is defined as having one or more attributes, they are placed in a linked list of attribute records as seen at 803, each of which specifies the defined attribute's name, its value if declared, its use (required/optional, fixed/default), and the data value handling object used to process the data. Each data handling object seenn at 805 supports methods for translating string data identified during parsing into integer format which is placed in the integer array, and for translating the integer data back into string format for rewriting markup and for communication with the user via the client applications user interface. A DTO 805 is preferably included in the system for all of the built in simple types defined by the W3C schema recommendation. When user-defined types are added, pointers to user written descendants of the base DTO class may be placed in the element and attribute definition structures to handle polymorphic datatype handling methods called by the system.

When the rule parsing functions described in connection with FIG. 5 are executed to isolate element names in an XML document being parsed, the identified element name may be searched for in the element_definition records and, if found in an element definition which is a root (parent=null), control is passed to an routine for processing the linked list of attribute definitions to process the element start tag and write attribute values to the integer array, and then crawling through the element hierarchy for the nested child elements to process the value data. Note that, when the flag value for a particular element indicates that it has mixed content, the routine checks to determine whether or not character data exists between defined elements. The routine, for each child element, assigns either a fixed number of value slots if it holds a fixed length value, or a single slot for holding an offset pointer to an array of slots with a leading size pointer. This slot location value is placed in the element_definition record (at slots).

Thus, a single titem holds all of the data values for all of the simple items contained through levels of nesting in the highest level complex type. Individual child items can be located within a defined complex element by its pathname (e.g. "purchaseOrder.billTo.name") to find the slot location. In addition, every child item has a fieldnumber which is its indexed location in the array of element_definition records. Given any fieldnumber, the name and itemtypenumber of its parent can be found via the chain of parent links.

To inteprete data in the integer array, the type identification number ("tin") in the header of the titem in integer sequence 807 is used as an index to find the root element_definition record in the array of element_definition records. Individual data values can be interpreted by locating the offset value in the slot field of the applicable-element definition record, which also identifies the DTO object to be used to handle data I/O for that data value.

APPLICATIONS

The mechanisms which have been described for representing typed fixed length and variable length data, including particularly parsed markup text and parsed natural language text, as a sequence of integer values, may be used to advantage in many applications.

In single processor systems, the use of these techniques permits the storage of data in more compact form, and permits the data to be more rapidly processed.

In distributed systems, the representation of data in a more compact format permits the movement of that data via communications facilities at faster rates or with reduced bandwidth, or both. By sharing commonly used stringtables among different datasets, and placing the shared stringtables at different locations, it is unnecessary to transmit the shared tables in order to send the words in those tables, so that still further reduction in the amount of data that needs to be sent is achieved.

It is to be understood that the specific programs, including particularly the programs listed in the accompanying appendix, are merely illustrative implementations of the invention. Numerous modifications can be made to the specific programs, functions and architectures described without departing from the true spirit and scope of the invention.

What is claimed is:

1. Apparatus for storing and processing a plurality of data items each comprising supplied data values organized in one or more fields, at least some of said fields containing variable length data values, and at least a given one of said supplied data values comprising a sequence of character values, at least some of which represent natural language text consisting of a sequence of natural language words, said apparatus comprising, in combination, a random access memory for storing an array of fixed-length binary integers, a first data converter for transforming each of said data values in each of said fields into a sequence of zero or more fixed-length integers and for storing each such sequence in said random access memory, said first data converter including means for convening each given one of said natural language words into one of said integers having a value which uniquely specifies said given natural language word, means for storing the number of integers in the sequence of integers representing the contents of each field containing said variable length data values, means responsive to the designation of a particular one of said natural language words for accessing a selected sequence of integers representing said given one of said supplied data values in a particular one of said fields by performing a search for the integer value representing said particular one of said words in said array, and a second data converter for transforming said selected sequence of integers into said sequence of character values representing said supplied data values in said particular one of said fields, said second data converter including means for transforming a sequence of integers representing a corresponding sequence of natural language words into the corresponding sequence of character values representing said natural language text.

2. Apparatus as set forth in claim 1 wherein each of said fields contains typed data, wherein said random access memory contains metadata specifying the data type of each of said fields, and wherein said first data converter and said second data converter perform transformations between character data representing supplied data values and sequences of one or more integers in accordance with the specified data type of each field containing data being transformed.

3. Apparatus as set forth in claim 1 wherein at least some of said data items include one or more link values each of which identifies a referenced data item in said plurality of data items and wherein each of said link values is transformed by said first data converter into an integer which designates the location in said random access memory of the stored sequence of integers representing said referenced data item.

4. Apparatus as set forth in claim 3 wherein at least some of said link values specify parent-child relationships between different data items in said plurality of data items.

5. Apparatus as set forth in claim 3 wherein at least some of said link values specify linked listings of different data items in said plurality of data items.

6. Apparatus as set forth in claim 1 wherein said character values are expressed in Extended Markup Language and wherein said first data conversion means transfonns said character values into a sequence of groups of integer values each representing an XML element, each given one of said groups representing an XML element including:

at least one integer designating the name of said XML element and the number of integer values in said given one of said groups, and a sequence of one or more integer values designating the content of said XML element.

7. Apparatus for storing and processing a plurality of data items each comprising supplied data values organized in one or more fields, at least a given one of said supplied data values comprising a sequence of character values, at least some of which represent natural language text consisting of a sequence of natural language words, and at least a further one of said data items including one or more link values each of which identifies a referenced data item in said plurality of data items, said apparatus comprising, in combination, a random access memory for storing an array of fixed-length binary integers, a first data converter for transforming each of said data values in each of said fields into a sequence of zero or more fixed-length integers and for storing each such sequence in said random access memory, said first data converter including means for converting each given one of said natural language words into one of said integers having a value which uniquely specifies said given natural language word, and wherein each of said link values is transformed by said first data converter into an integer which designates the location in said random access memory of the stored sequence of integers representing said referenced data item, means responsive to the designation of a particular one of said natural language words for accessing a selected sequence of integers representing said given one of said supplied data values in a particular one of said fields by performing a search for the integer value representing said particular one of said words in said array, and a second data converter for transforming said selected sequence of integers into said sequence of character values representing said supplied data values in said particular one of said fields, said second data converter including means for transforming a sequence of integers representing a corresponding sequence of natural language words into the corresponding sequence of character values representing said natural language text.

8. Apparatus as set forth in claim 7 wherein at least some of said link values specify parent-child relationships between different data items in said plurality of data items.

9. Apparatus as set forth in claim 7 wherein at least some of said link values specify linked listings of different data items in said plurality of data items.

10. Apparatus as set forth in claim 7 wherein each of said fields contains typed data, wherein said random access memory contains metadata specifying the data type of each of said fields, and wherein said first data converter and said second data converter perform transformations between character data representing supplied data values and sequences of one or more integers in accordance with the specified data type of each field containing data being transformed.

11. Apparatus as set forth in claim 7 wherein said character values are expressed in Extended Markup Language and wherein said first data conversion means transforms said character values into a sequence of groups of integer values each representing an XML element, each given one of said groups representing an XML element including:
- at least one integer designating the name of said XML element and the number of integer values in said given one of said groups, and
- a sequence of one or more integer values designating the content of said XML element.

12. Apparatus for storing and processing a plurality of data items each comprising supplied data values organized in one or more fields, at least a given one of said supplied data values comprising a sequence of character values expressed in Extended Markup Language, at least some of which represent natural language text consisting of a sequence of natural language words, said apparatus comprising, in combination,
- a random access memory for storing an array of fixed-length binary integers,
- a first data converter for transforming each of said data values in each of said fields into a sequence of zero or more fixed-length integers and for storing each such sequence in said random access memory, said first data converter including means for converting each given one of said natural language words into one of said integers having a value which uniquely specifies said given natural language word, and wherein said first data conversion means transforms said character values into a sequence of groups of integer values each representing an XML element, each given one of said groups representing an XML element including:
  - at least one integer designating the name of said XML element and the number of integer values in said given one of said groups, and
  - a sequence of one or more integer values designating the content of said XML element,
- means responsive to the designation of a particular one of said natural language words for accessing a selected sequence of integers representing said given one of said supplied data values in a particular one of said fields by performing a search for the integer value representing said particular one of said words in said array, and
- a second data converter for transforming said selected sequence of integers into said sequence of character values representing said supplied data values in said particular one of said fields, said second data converter including means for transforming a sequence of integers representing a corresponding sequence of natural language words into the corresponding sequence of character values representing said natural language text.

13. Apparatus as set forth in claim 12 wherein each of said fields contains typed data, wherein said random access memory contains metadata specifying the data type of each of said fields, and wherein said first data converter and said second data converter perform transformations between character data representing supplied data values and sequences of one or more integers in accordance with the specified data type of each field containing data being transformed.

\* \* \* \* \*